United States Patent
Conchas et al.

(10) Patent No.: US 6,978,092 B2
(45) Date of Patent: Dec. 20, 2005

(54) APPARATUS FOR OPTICAL COMMUNICATION USING A LARGE-AREA PRIMARY REFLECTOR

(75) Inventors: Juan Baltazar Conchas, Cedar Park, TX (US); Angel Eduardo Sanchez, Austin, TX (US)

(73) Assignee: OcuNET Devices LLC, Cedar Park, TX (US)

( * ) Notice: Subject to any disclaimer, the term of this patent is extended or adjusted under 35 U.S.C. 154(b) by 0 days.

(21) Appl. No.: 10/832,892

(22) Filed: Apr. 27, 2004

(65) Prior Publication Data

US 2004/0213587 A1    Oct. 28, 2004

Related U.S. Application Data

(60) Provisional application No. 60/466,119, filed on Apr. 28, 2003.

(51) Int. Cl.[7] ............................................. H04B 10/00
(52) U.S. Cl. ........................ 398/121; 398/128; 398/130
(58) Field of Search ........................ 398/118–131, 135, 398/138

(56) References Cited

U.S. PATENT DOCUMENTS

| | | | | |
|---|---|---|---|---|
| 4,358,858 A | * | 11/1982 | Tamura et al. ............... | 398/122 |
| 4,882,772 A | * | 11/1989 | Rist et al. .................... | 398/129 |
| 5,390,040 A | * | 2/1995 | Mayeux ....................... | 398/129 |
| 5,986,787 A | * | 11/1999 | Ohshima et al. ............ | 398/127 |
| 6,285,476 B1 | * | 9/2001 | Carlson et al. ............... | 398/9 |
| 6,347,001 B1 | * | 2/2002 | Arnold et al. .............. | 398/122 |
| 6,462,846 B1 | * | 10/2002 | DeLong ...................... | 398/135 |

* cited by examiner

*Primary Examiner*—Jason Chan
*Assistant Examiner*—Dalzid Singh
(74) *Attorney, Agent, or Firm*—Buchanan Ingersoll PC

(57) ABSTRACT

An optical transceiver includes an opaque element having a concave reflective surface arranged in a path of each of an outgoing and an incoming light signal, the reflective surface configured to redirect the paths of the respective light signals. An optical detector is arranged facing the reflective surface. The optical detector is configured to detect a redirected incoming light signal from the reflective surface and to generate therefrom a receive signal proportional to the incoming light signal. An emitter is arranged facing the reflective surface. The emitter is configured to generate the outgoing light signal proportional to a transmit signal. A lens assembly is arranged between the reflective surface of the opaque element and both the optical detector and the emitter. The lens assembly is configured to couple the redirected incoming light signal to the optical detector and to couple the outgoing light signal to the reflective surface.

66 Claims, 18 Drawing Sheets

APPARATUS FOR OPTICAL COMMUNICATION USING A LARGE-AREA PRIMARY REFLECTOR

RELATED APPLICATIONS

This application claims the benefit of U.S. Provisional Patent No. 60/466,119, titled "Optical Wireless Communications Device Having a Large Area Primary Reflector", filed on Apr. 28, 2003, the entire contents of which are incorporated here by reference.

BACKGROUND

The optical signals carried in a wireless optical communication system travel, at least in part, through free space. Important in the design of such systems are the interface components used to launch light signals into free space from a fixed medium, such as a fiber optic cable, and to receive light signals into such a cable from free space. These interface components can include optical receivers, transmitters, transceivers (devices that both transmit and receive optical signals), and couplers that couple light between transmission media, such as the interface between air and an optical fiber.

Systems designers strive to make the transfer characteristics of the interface components as efficient and accurate as possible. This is due, in part, to the challenges associated with coupling light signals directly into a fiber, as compared to coupling light signals to or from an optical detector or emitter. The objective lenses of these components, or the lenses or lens system that first receives the light rays from free space or from the fiber, typically include highly-polished lenses made of glass. Because of the design constraints involved, lens manufacturers tend to use similar designs, including using similar materials, such as glass, shapes, such as circular, and rigidity. As such, the objective lens products that are commercially available for use in wireless optical communication systems tend be similar in size, cost, and performance allowing little choice in the design of a system.

FIG. 1 illustrates a lensed optical receiver for use in a wireless optical communication system, in which an optical signal 1 first enters a circular objective lens 2. The objective lens 2 can focus the optical signal 1 onto a second lens 3 configured to align the incoming rays of light that form the optical signal 1. The aligned optical signal can be passed through a wavelength specific filter 4 that filters out non-signal-carrying light rays from the aligned beam. The wavelength response of the filter 4 can have an angular dependence, in which case the collimating lens 3 should be included in the system to optimize performance of the receiver. The aligned and filtered optical signal can be passed through a focusing lens 5, that focuses the signal of an optical detector 6.

The optical detector 6 can be a photodiode, phototransistor, avalanche photodiode, photomultiplier tube, piezoelectric device, charged coupled device (CCD), or any other device that can produce a signal in response to an optical stimulus. The optical detector 6 can generate a signal that is proportional to the light energy of the optical signal 1. The generated signal can be a voltage, a current, or another light signal. A line driver 7 can be used to drive the generated signal down a wire or optical cable 8. The optics and circuitry of the receiver can be housed or enclosed within a water tight, and preferably hermetically sealed, enclosure 9.

The enclosure 9 can help to maintain an alignment of the optics and to protect the circuitry from exposure to the environment.

The design of an optical transmitter for use in a wireless optical communication system can be similar to the optical receiver shown in FIG. 1 because of the bipolar nature of light as it travels through an optical system. FIG. 2 illustrates a lensed optical transmitter, in which an information-carrying signal can be provided through a wire or optical fiber cable 15. Circuitry 14 can be provided to receive, amplify, condition, and process the voltage, current, or optical signal carried over the cable 15. The circuitry 14 can be configured to drive an optical emitter 13 that can convert the information-carrying signal into optical energy. The emitter can be a laser, light emitting diode or other similar light-emitting device.

A secondary lens 12 can be included in the transmitter to magnify the light emitted by the emitter 13. Unlike the receiver shown in FIG. 1, an optical filter is typically not needed in an a transmitter, as the optical emitter can be designed to emit only the desired wavelengths of light. An objective lens 11 can align the rays of light 10 of the emitted beam, such that the beam can be transmitted over a range to a distant receiver (not shown). As with the receiver shown in FIG. 1, the optics and circuitry of the transmitter can be protected by an enclosure 16 that is watertight, and preferably hermetically sealed. Because of the typically large size of the objective lenses 3, 11 and the precision that should be maintained in the alignment of the optics of the receiver and transmitter, such enclosures can be bulky and expensive to manufacture.

SUMMARY

Accordingly, apparatus are disclosed for optical communication using a large-area primary reflector. According to an exemplary embodiment, an optical receiver is described for receiving a light signal, including an opaque objective element having a concave reflective surface arranged in a path of the light signal, the reflective surface configured to redirect the path of the light signal; an optical detector arranged facing the reflective surface, the optical detector configured to detect a redirected light signal from the reflective surface and to generate therefrom a receive signal proportional to the light signal; and a lens assembly arranged between the reflective surface and the optical detector, the lens assembly configured to couple the redirected light signal to the optical detector.

According to another exemplary embodiment, an optical transmitter is described for transmitting a light signal, including an emitter configured to generate a light signal proportional to a transmit signal; an opaque element having a concave reflective surface arranged facing the emitter in a path of the generated light signal, the reflective surface configured to redirect the path of the generated light signal; and a lens assembly arranged between the reflective surface of the opaque element and the emitter, the lens assembly configured to couple the generated light signal to the reflective surface.

According to an exemplary embodiment, an optical transceiver is described for transmitting and receiving light signals, including an opaque element having a concave reflective surface arranged in a path of each of an outgoing and an incoming light signal, the reflective surface configured to redirect the paths of the respective light signals; an optical detector arranged facing the reflective surface, the optical detector configured to detect a redirected incoming light signal from the reflective surface and to generate therefrom a receive signal proportional to the incoming light signal; an emitter arranged facing the reflective surface, the emitter configured to generate the outgoing light signal proportional to a transmit signal; and a lens assembly arranged between the reflective surface of the opaque element and both the optical detector and the emitter, the lens assembly configured to couple the redirected incoming light signal to the optical detector and to couple the outgoing light signal to the reflective surface.

According to yet another exemplary embodiment, an optical transceiver is described for transmitting and receiving light signals, including an emitter configured to generate an outgoing light signal proportional to a transmit signal; an opaque element having a concave reflective surface arranged facing the emitter in a path of the outgoing light signal, the reflective surface configured to redirect the path of the generated outgoing light signal; a first lens assembly arranged between the reflective surface and the emitter, the first lens assembly configured to couple the generated outgoing light signal to the reflective surface; an optical detector arranged facing away from the reflective surface in a path of an incoming light signal, the optical detector configured to detect the incoming light signal and to generate a receive signal proportional thereto; and a second lens assembly arranged between the optical detector and a distant transmitter of the incoming light signal, the second lens assembly configured to couple the incoming light signal to the optical detector.

According to an exemplary embodiment, an optical transceiver is described for transmitting and receiving light signals, including an opaque objective element having a concave reflective surface arranged in a path of an incoming light signal, the reflective surface configured to redirect the path of the incoming light signal; an optical detector arranged facing the reflective surface, the optical detector configured to detect a redirected incoming light signal from the reflective surface and to generate therefrom a receive signal proportional to the incoming light signal; a first lens assembly arranged between the reflective surface and the optical detector, the first lens assembly configured to couple the redirected incoming light signal to the optical detector; an emitter arranged facing away from the reflective surface, the emitter configured to generate an outgoing light signal proportional to a transmit signal; and a second lens assembly configured to couple the outgoing light signal to a transmission medium between the emitter and a distant receiver of the outgoing light signal.

According to another exemplary embodiment, an optical coupler for coupling light signals between different transmission media, including an opaque element having a concave reflective surface arranged in a path of each of an outgoing light signal carried over a fiber optic cable and an incoming light signal carried over free space, the reflective surface configured to redirect the paths of the respective light signals; and a lens assembly arranged between the reflective surface of the opaque element and the fiber optic cable, the lens assembly configured to couple the outgoing light signal from the fiber optic cable to the reflective surface and to couple a redirected incoming light signal from the reflective surface to the fiber optic cable, wherein a redirected outgoing light signal from the reflective surface of the opaque element can be carried over free space.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computer system. For example, it will be recognized that in each of the embodiments, the various actions can be performed by specialized circuits or circuitry (e.g., discrete and/or integrated logic gates interconnected to perform a specialized function), by program instructions being executed by one or more processors, or by a combination of both.

Thus, the various aspects can be embodied in many different forms, and all such forms are contemplated to be within the scope of what is described. For each of the various aspects, any such form of embodiment can be referred to here as "circuitry configured to" perform, or "circuitry that" performs a described action.

Figure 3A:
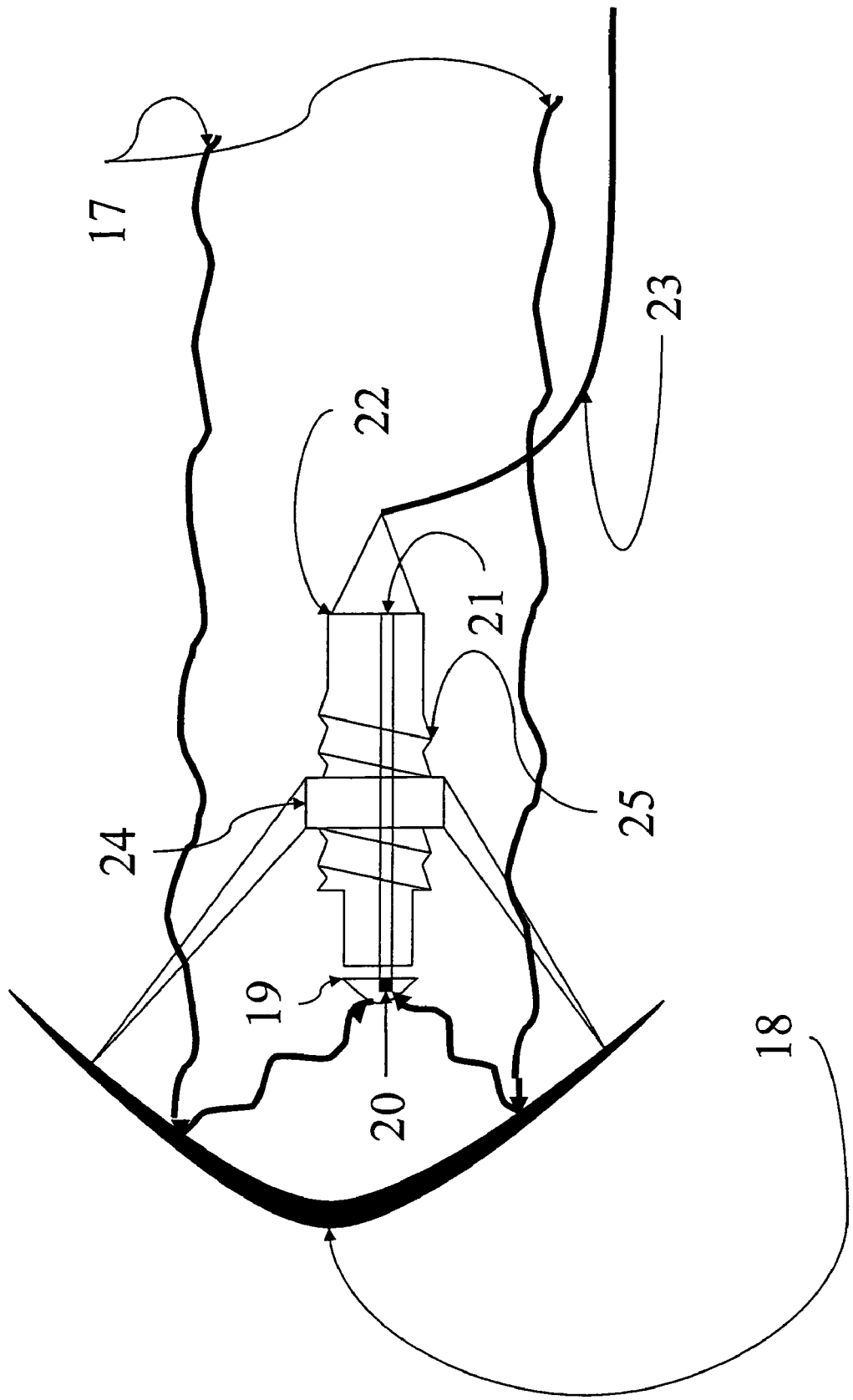
FIG. 3A illustrates an optical receiver according to an exemplary embodiment.

FIG. 3A illustrates an optical receiver according to an exemplary embodiment. In the embodiment shown, an opaque objective element 18 having a concave reflective surface is arranged in a path of an optical wireless signal 17. The objective element 18 is at least opaque to light having wavelengths of about 300 nm to about 2000 nm, but can block or absorb other wavelengths of light as well. The objective element 18 can redirect and focus the optical signal 17 toward a focal point of the receiver where the optical energy of the incoming signal 17 is concentrated. The opaque element 18 with its reflective surface is also referred to here simply as a "reflector".

The reflective surface of the objective element 18 can be aspheric in shape and can generally have a parabolic cross-sectional contour as shown in the figure. A parabolic reflective surface can be used to design an optical receiver that has a convenient focal point when focusing on long-range transmitters in which rays of the incoming signal 17 are highly aligned. The objective element 18 can be of any shape as long as the reflective surface remains sufficiently contoured, for example parabolic. This offers an advantage over glass objective, which in general, must be circular. The objective element 18 can be made of opaque materials, such as molded plastics or durable stamped metals such as aluminum, which can be cost-effective when molding an aspheric surface, such as a parabola. In contrast, glass objective lenses can be costly to form into a desired contour. In addition, an opaque objective element made of plastic or aluminum can, in general, be made to be larger than a glass lens at a relatively lower cost.

The reflective surface of the objective element 18 can be polished to produce an optical quality reflective surface. In addition, the reflective surface can be configured to selectively redirect at least one wavelength component of the light signal 17. For example, the reflective surface can be coated with a material that absorbs light of certain wavelengths and reflects other wavelengths of light. The reflective surface can be colored to pass only certain wavelengths of light energy. In addition, the surface can be machined, such as including grating or etching to selectively pass particular wavelengths of light.

In the receiver shown in FIG. 3A, an optical detector 20 is arranged facing the concave reflective surface of the objective element 18. The optical detector 20 is arranged to detect the optical signal 17 that is reflected or redirected off the reflective surface, and is configured to generate therefrom a receive signal that is proportional to the optical signal 17. The optical detector 20 can be a photodiode, phototransistor, avalanche photodiode, photomultiplier tube, piezoelectric device, CCD, or other similar device capable of producing a signal proportional to amount of detected light energy in response to an optical stimulus. The generated signal can be a voltage, a current, or another light signal.

It can be beneficial in the design of the receiver to use a large-area detector that requires a relatively low bias voltage. Using a large-area detector can ease the design constraints placed on the optics of the receiver, allowing for the use of lower grade, economically manufacturable optical elements. Such optical elements can be made relatively large without adversely affecting the coupling of the optical signal 17 onto the detector 20. A low bias voltage can aid in minimizing energy consumption to extend battery life for portable applications. Large-area photodiodes are particularly well suited for use in the receiver. In addition, a compensating lens (not shown) can be used to magnify the detection range of a relatively small photodiode. The compensating lens can be oriented facing the reflective surface of the objective element 18, and can effectively increase the active area of the photodiode as seen reflective surface. Such an arrangement can also be used to compensate for defects in the surface of the reflective surface of the element 18.

Figure 3B:
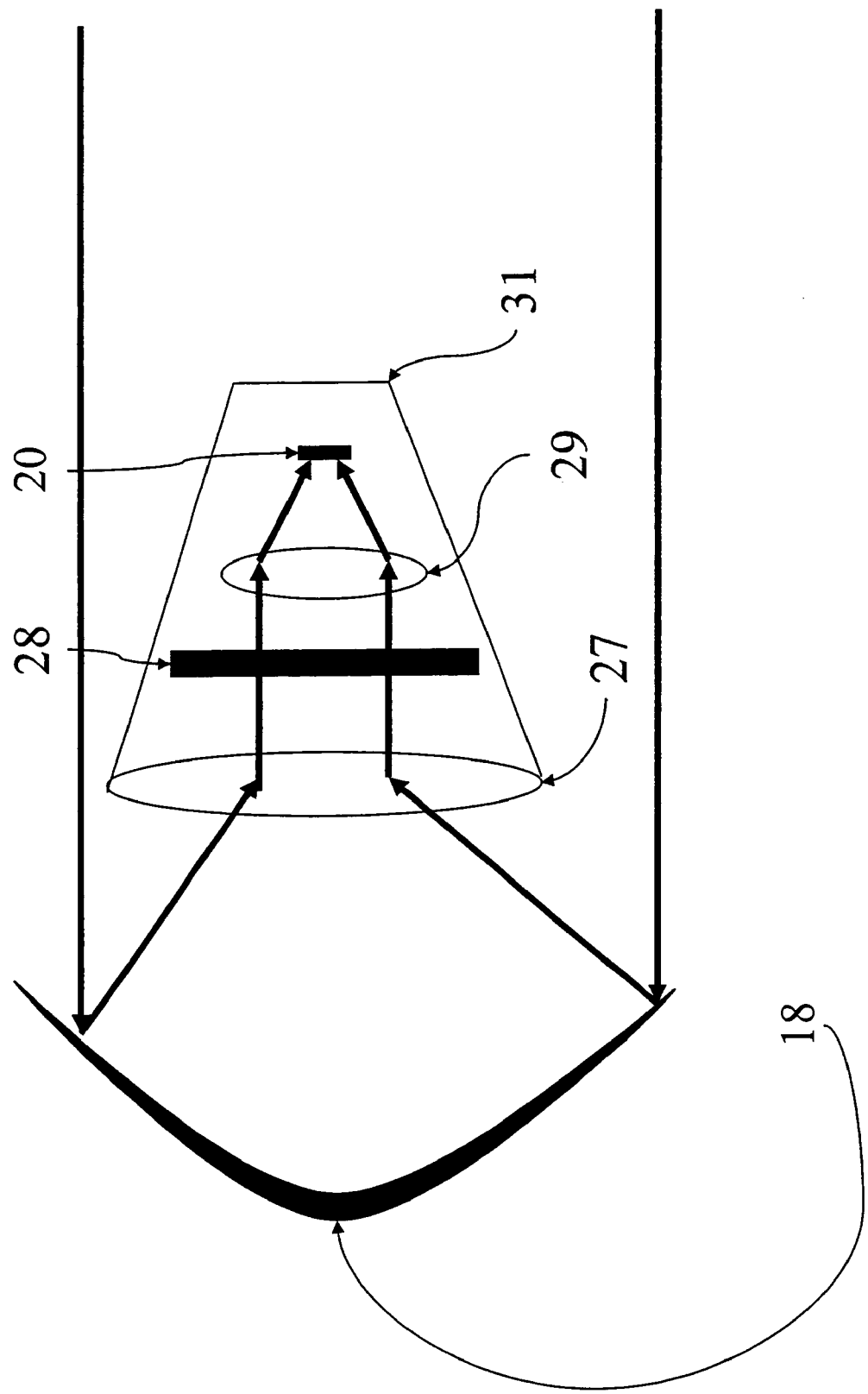
FIG. 3B illustrates the components of a detector lens assembly.

The receiver of FIG. 3A further includes a lens assembly 19 arranged between the reflective surface 18 and the optical detector 20. The lens assembly 19 is configured to couple the redirected light signal 17 to the optical detector 20. FIG. 3B illustrates the components of a first exemplary embodiment of the lens assembly 19. According to this embodiment, the assembly 19 can include a first lens 27 configured to align portions of the redirected light signal 17 from the reflective surface of the objective element 18. A wavelength filter 28 can be arranged to selectively pass at least one wavelength component of the aligned portions of the redirected light signal 17 from the first lens 27. The lens assembly 19 can also include a second lens 29 configured to focus the aligned and filtered portions of the redirected light signal 17 onto a portion of the optical detector 20. The entire optical assembly can be encapsulated in a bullet-shaped enclosure 31, as shown in the figure. The enclosure 31 can provide protection against environment elements and can be used to maintain the orientation of the components that comprise the lens assembly 19. This arrangement the lens assembly can be particularly useful when the detector 20 has a relatively small active area.

Figure 3C:
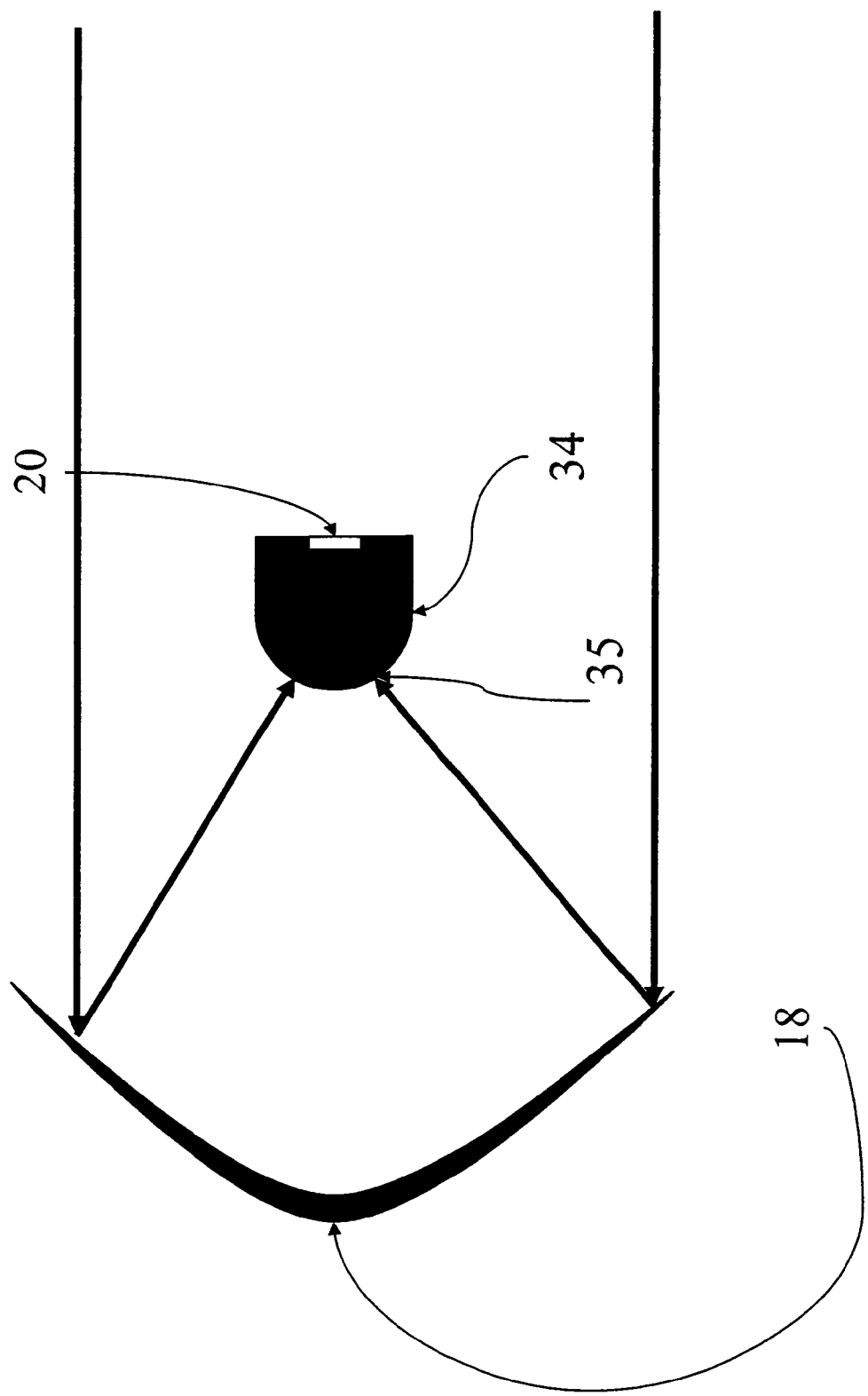
FIG. 3C illustrates another arrangement of a detector lens assembly.

FIG. 3C illustrates another arrangement of the lens assembly 19 according to a second exemplary embodiment. In this arrangement, a lens 34 encapsulates the optical detector 20. The encapsulating lens 34 can include a wavelength filter 35 configured to selectively pass at least one wavelength component of the redirected light signal 17 to the optical detector 20. The reflected light signal 17 can be focused on the active region of the detector 20 as it passes through the lens 34. This relatively simple arrangement can be more cost-effective than the arrangement shown in FIG. 3B, but can require a more sensitive optical detector 20, or can require a detector with a relatively larger active area.

The receiver shown in FIG. 3A can further include a carrier 25 encapsulating the optical detector 20 and the lens assembly 19. A mounting assembly 24 can be configured to moveably attach the carrier 25 to the objective element 18. In addition, a focusing mechanism can be configured to vary a position of the lens assembly 19 in relation to the reflective surface 18 to change a concentration of the redirected light signal 17 coupled to the optical detector 20. Typically, a well-focused optical system is preferred. A well-focused systems offers optical coupling advantages by concentrating a maximum amount of light on the detector 20. In other circumstances, a less-focused, blurry optical system can offers advantages. For example, a less-focused system can provide tolerance to drifting mechanical positions of the receiver or a corresponding distant transmitter.

According to an exemplary embodiment, the focusing mechanism can include a first screw thread disposed on an external surface of a substantially cylindrical or conical portion of the carrier 25. A second screw thread can be disposed on an internal surface of a corresponding and substantially cylindrical or conical portion of the mounting assembly 24. The concentration of the redirected light signal 17 coupled to the optical detector 20 can be changed by rotating the carrier 25 in relation to the mounting assembly 24 when the first and second screw threads are engaged. The arrangement allows the position of the lens assembly 19 to be varied in relation to the reflective surface of the objective element 18. A similar arrangement can be used to provide for adjusting the location of the lens assembly 19 to the right and left, and upward and downward, with respect to the reflective surface 18.

The carrier 25 and mounting assembly 24 help to maintain the performance of the receiver maintaining a preferred arrangement of optical elements of the receiver in relation to the objective element 18. The carrier 25 also helps to secure all electronics and other sensitive devices of the receiver, and can include connection points for cabling, and the like. The carrier's diameter can preferably be made to be relatively small with respect to the cross-sectional area of the reflective surface 18, such that the carrier 25 will not block a sizeable portion of the incoming signal 17. The carrier 25 can be water-tight, and is preferably hermetically sealed to protect against the environmental elements. The expense of environmentally hardening this relatively small portion of the receiver offers advantages in both cost and weight over other designs that use transparent objective lens.

The receiver of FIG. 3A can also include circuitry configured to condition the receive signal generated by the optical detector 20 for transmission over a transmission medium, such as the transmission cable 23 shown. The circuitry can be included on a circuit board 21 and can be used to amplify, buffer, filter and otherwise process the receive signal. When a photodiode is used as the detector 20, the circuitry 21 can also include a suitable amplifier that can operate with higher capacitance, larger-area photodiodes. Like all integrated devices, photodiodes include an amount of unwanted or parasitic capacitance. The parasitic capacitance is generally inversely proportional to the applied bias voltage, and varies with the operating frequency of the diode. In addition, the parasitic capacitance is affected by the overall active area of the detector. Larger photodiodes exhibit a higher parasitic capacitance. Since larger-area photodiodes can be preferred to reduce the constraints placed on the optics portion of the receiver.

A suitable amplifier for interfacing with large-area photodiode or multiple photodiodes is a common base (or common gate) amplifier. The design of such amplifiers are known to those skilled in the art, and will not be discussed in detail here. The photodiode can be connected to the emitter (or source) of the amplifier, and can modulate the current through amplifier in response to the detected light signal. An advantage of this type of amplifier over a common emitter (or common source) configuration, typically used in single-stage amplifier designs, is the low input impedance of the amplifier presented at the emitter (or source) terminal connected to the photodiode. This input impedance, of magnitude 1/gm, governs the overall bandwidth of the amplifier. The common base (or gate) topology also isolates the input capacitance, which is high (as a result of the large-area photodiode), from the output capacitance of the amplifier, which in many cases can be relatively low. The common base configuration thus allows the gain-bandwidth of the amplifier to be governed not by the source capacitance presented by the photodiode, but rather by the parasitic collector capacitance of the amplifier transistor itself, which is relatively low.

The receiver of FIG. 3A can also include a driver 22 configured to transmit the conditioned receive signal from the optical detector 20 over the transmission medium 23. The driver 22 can be a line driver used to drive a copper transmission line, such as a coaxial cable or twisted pair, or can be an electrical-to-optical interface capable of sending the receive signal over an optical medium, such as a fiber optic cable. The output driver 22 can be designed to interface with additional devices (not shown), such as a network processor or other device that can translate to the receive signal more exotic media, such as radio frequency (RF). Standard methods of interfacing, such impedance and bandwidth matching implementations can be used to match the cable 23 and to the output driver 23 and any other connected devices. The circuitry 21 and the driver 22 can be encapsulated in the carrier 25 to protect the electronics from the environment.

Figure 4A:
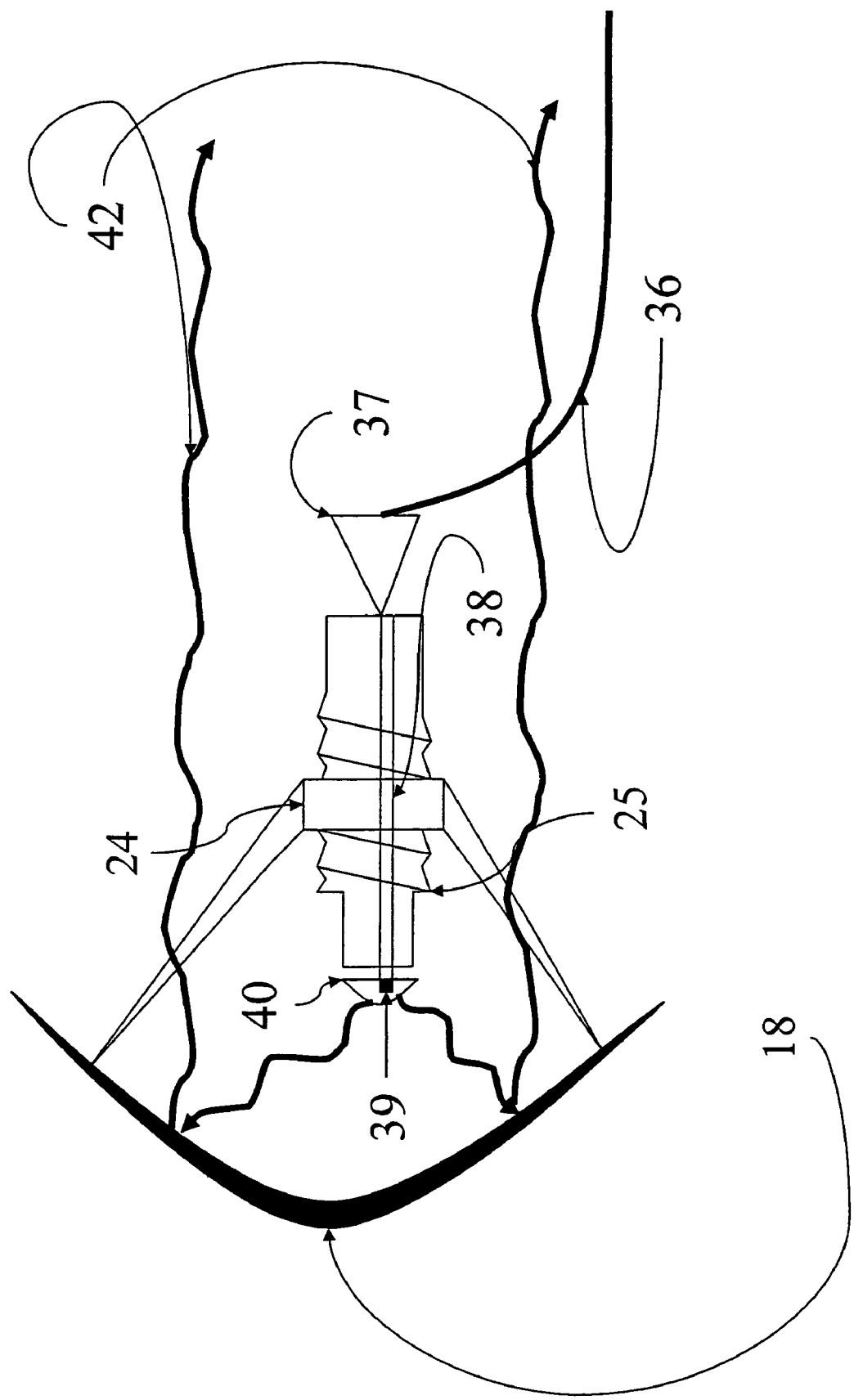
FIG. 4A illustrates an optical transmitter according to an exemplary embodiment.

FIG. 4A illustrates an optical transmitter according to an exemplary embodiment. The bipolar nature of light as it travel through an optical system allows for the use of similar optical elements as those described in conjunction with receiver shown in FIG. 3A. In the exemplary transmitter of FIG. 4A, a transmit signal can be presented at the transmitter using a cable 36, such as a coaxial cable or an optical fiber. The transmit signal can be detected and processed by a line receiver or optical-to-electrical receiver 37. The transmitter can include circuitry integrated on a circuit board 38, including amplifiers, filters, and other control and processing circuitry. The circuitry 38 can perform analog or digital functions on the transmit signal to render a suitable signal for driving an optical emitter 39.

The emitter 39 can be a light emitting diode (LED), a laser diode, a semiconductor laser, a gas laser, a light bulb, a lamp or other suitable device that is capable of generating a light signal that is proportional to the conditioned transmit signal generated by the circuitry 38. The transmitter includes the opaque element 18 having a concave reflective surface arranged facing the emitter 39 in a path of the generated light signal. The reflective surface 18 is configured to redirect the path of the generated light signal, resulting in the output beam 42. The output beam 42 can be directed to a distant receiver (not shown). The reflective surface 18 can be configured to align the reflected output beam 42. The transmitter also includes a lens assembly 40 arranged between the reflective surface of the opaque element 18 and the emitter 39. The lens assembly 40 is configured to couple the light signal generated by the emitter 39 to the reflective surface 18.

Figure 2:
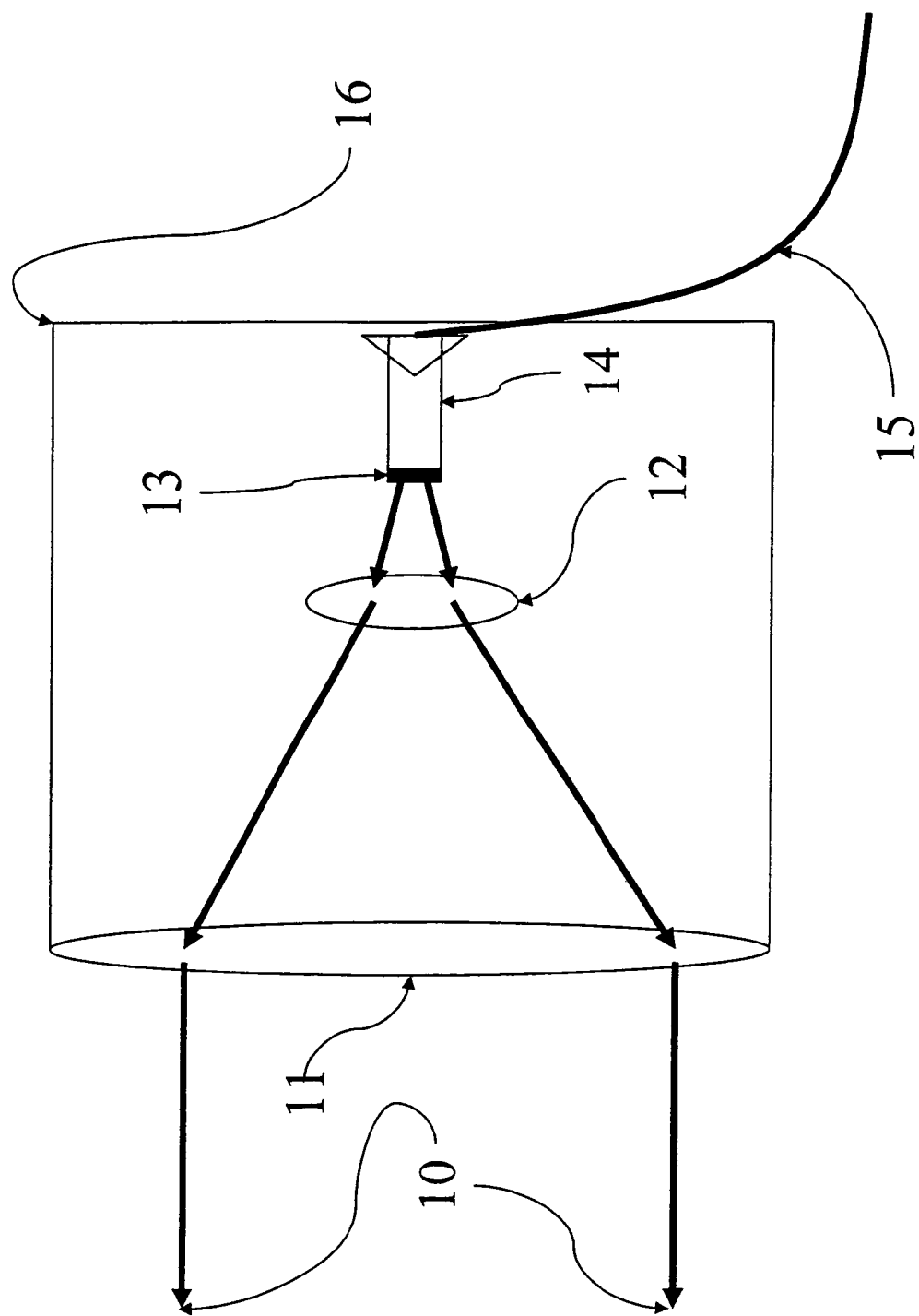
FIG. 2 illustrates a lensed optical transmitter for use in a wireless optical communication system.

The transmitter can further include a carrier 25 encapsulating the emitter 39 and the lens assembly 40, similar to the carrier 25 shown in FIG. 3A. In addition, a similar mounting assembly 24 can be configured to moveably attach the carrier 25 to the objective element 18. In addition, a similar focusing mechanism can be configured to vary a position of the lens assembly 40 in relation to the reflective surface 18, to change a concentration of the generated light signal coupled to the reflective surface 18. For a parabolic reflective surface 18, positioning the carrier 25 and lens assembly 40 toward or away from the can vary the divergence of the generated light signal on the reflective surface 18, making the signal more narrow or wider, respectively. Adjusting the divergence of the generated light signal from the emitter 39 can be useful when designing transmitters for a variety of ranges or distances. As with the receiver shown in FIG. 3A, the transmitter shown in FIG. 4A with its opaque element 18 offers cost, size, weight, and flexibility advantages over the lensed transmitter system shown in FIG. 2.

Figure 4B:
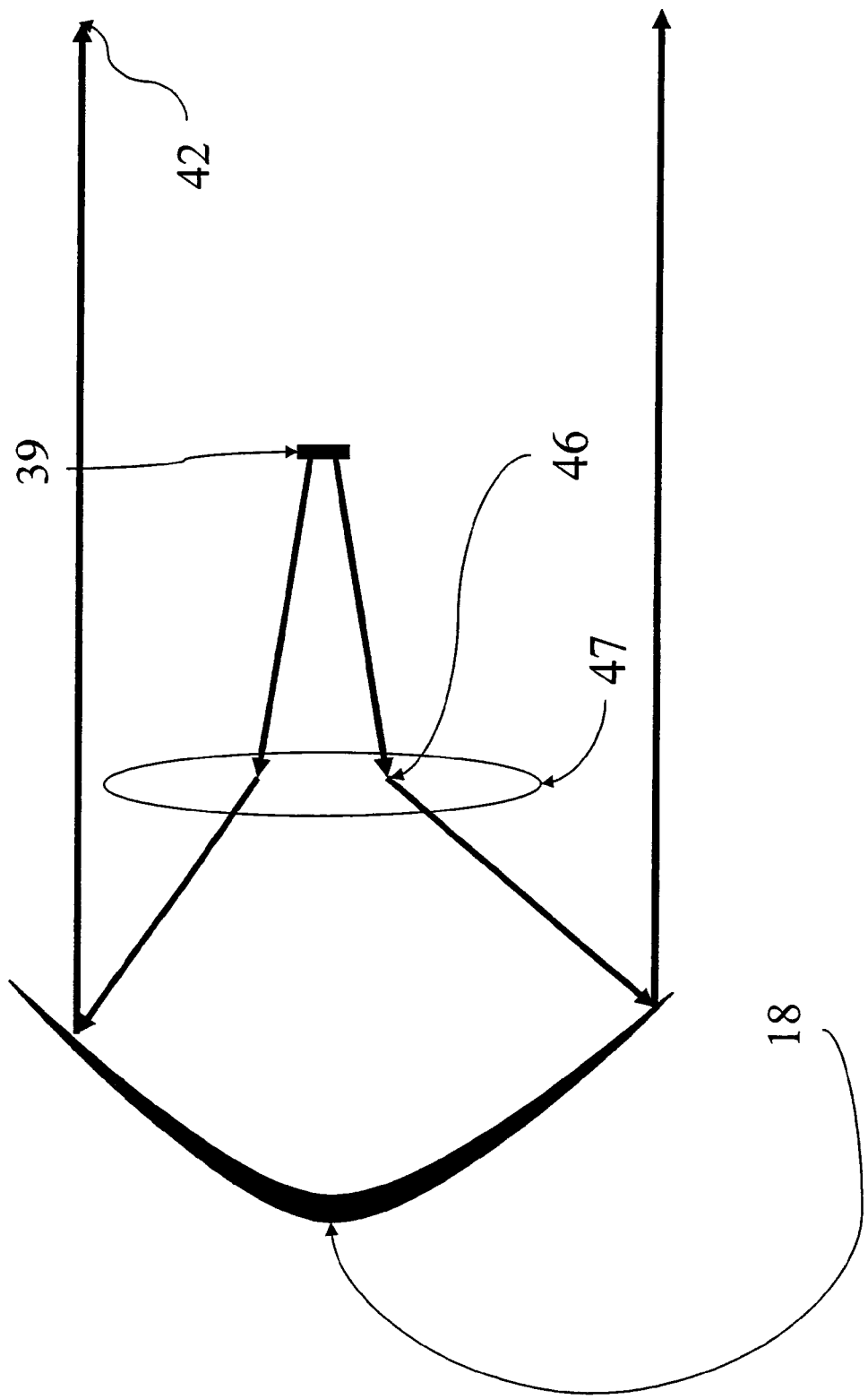
FIG. 4B illustrates details of an emitter lens assembly.
Figure 4C:
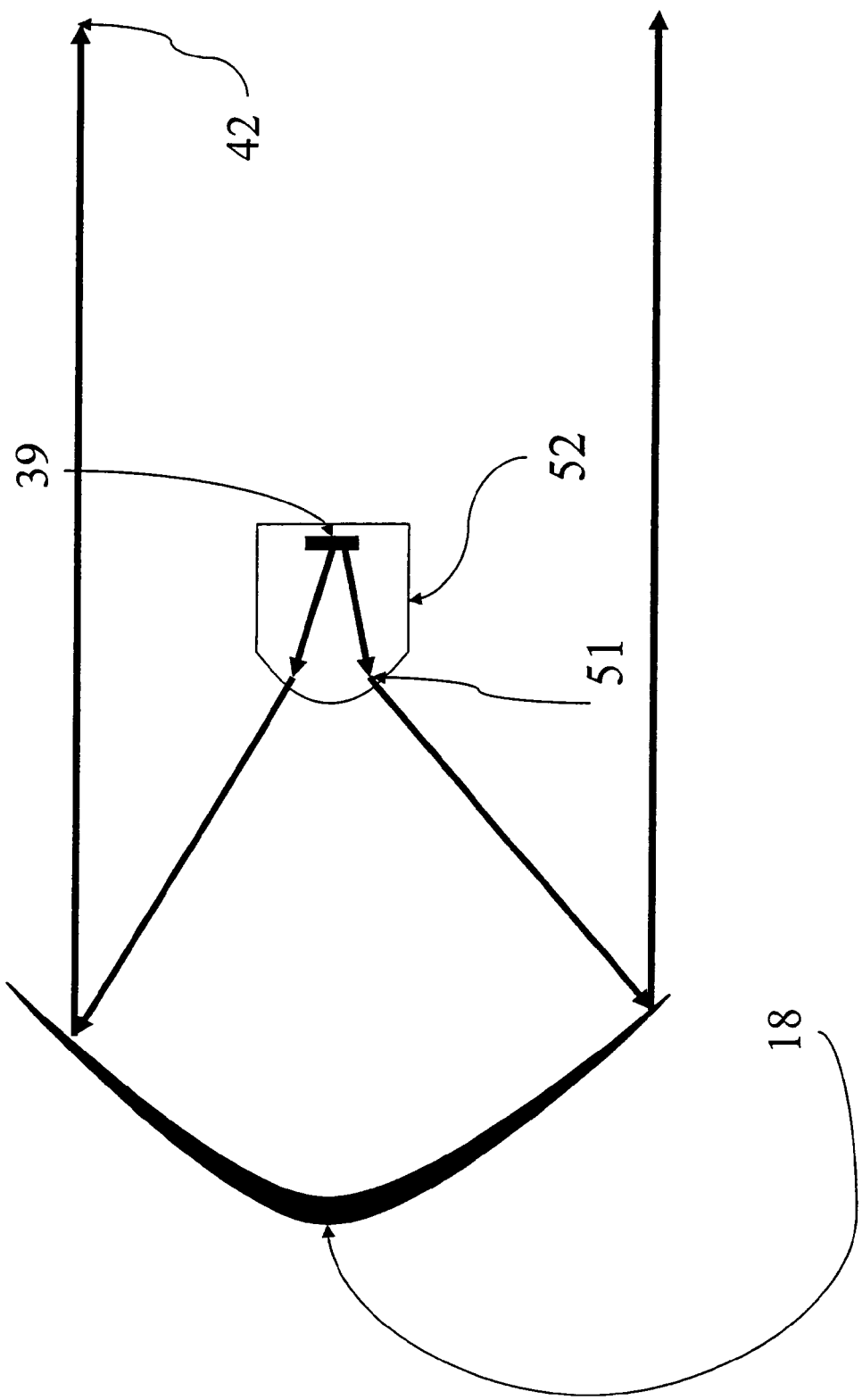
FIG. 4C illustrates another emitter lens assembly with integrated lens and filter.

As shown in FIG. 4B, the lens assembly 40 can include a lens 47 configured to spread the generated light signal from the emitter 39 as the signal passes through the lens 47. The generated light signal can be spread to produce a beam 46 that irradiates substantially the entire reflective surface of the opaque element 18. Filling substantially the entire reflective surface 18 can result in a lower percentage of the generated light signal being lost as a result of defects on the reflective surface 18 or obstructions between the transmitter and receiver path. In addition, filling substantially the entire reflective surface 18 can lower the power density of the reflected signal 42. An alternate arrangement of the lens assembly 40 is shown in FIG. 4C, in which the emitter is encapsulated in a lens 52, at least a portion 51 of which is configured to spread the generated light signal as it pass through the lens 52 to the reflective surface 18.

Figure 5A:
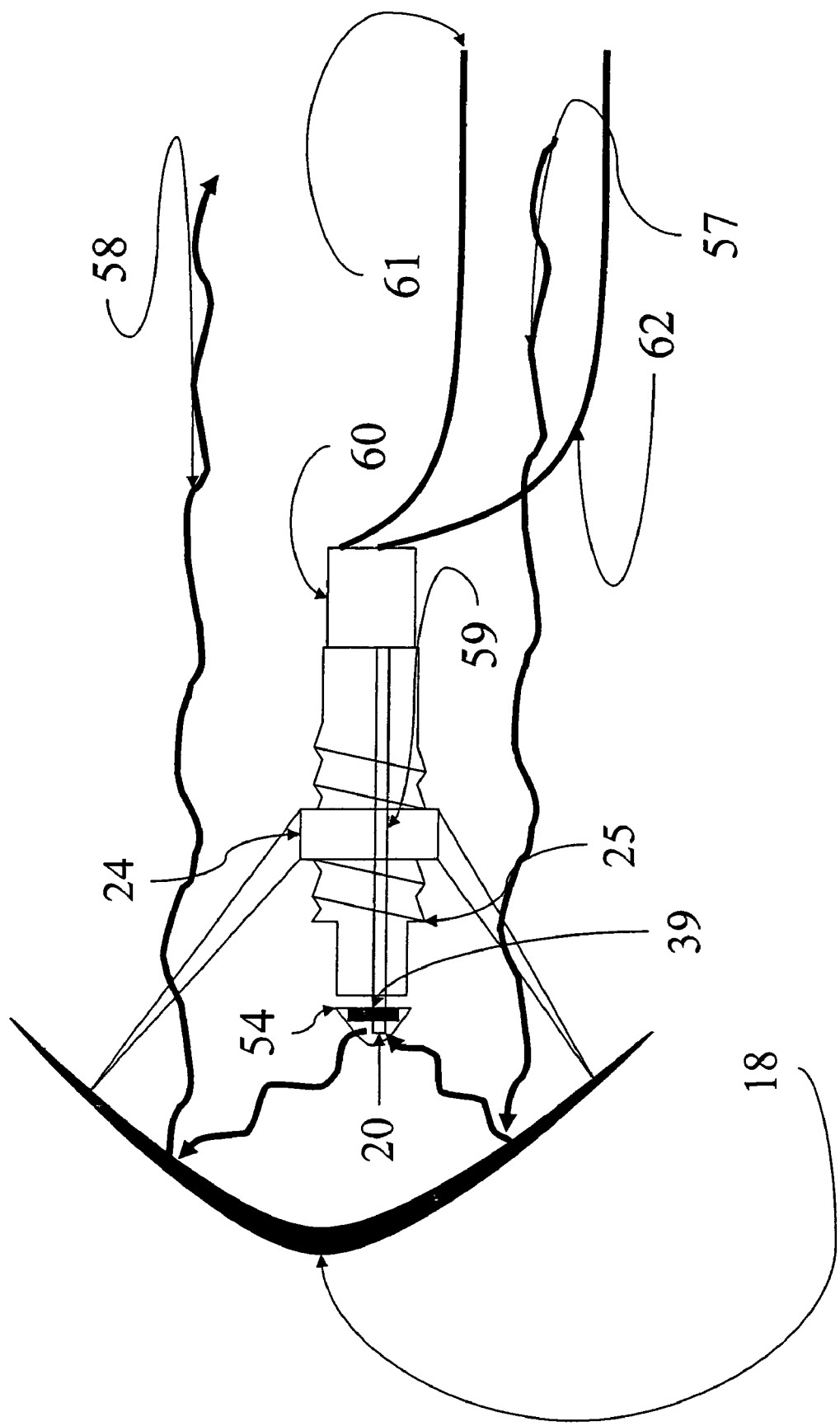
FIG. 5A illustrates a single reflector wireless optical transceiver.
Figure 5B:
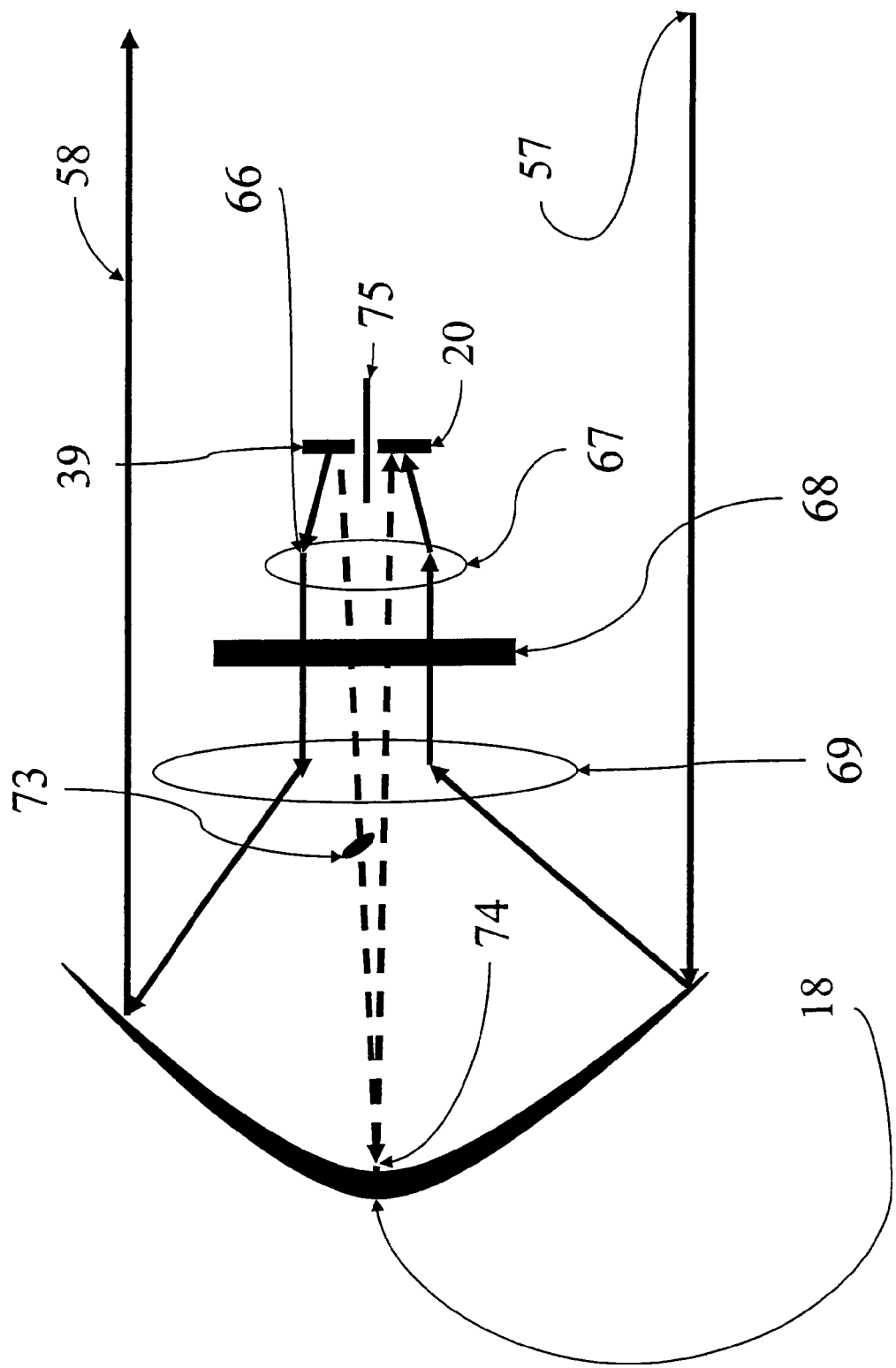
FIG. 5B illustrates a full-duplex single reflector transceiver.

FIGS. 5A and 5B illustrate an optical transceiver according to an exemplary embodiment. This transceiver combines elements of the optical receiver and transmitter shown in FIGS. 3A and 4A, respectively, in an arrangement that allows the same opaque element 18 having a concave reflective surface to be used for both transmitting and receiving optical signals. The transmit and receive functions can be time multiplexed where one of the receiver and transmitter functions is idled while the other is operational. This mode of operation is often referred to as the half-duplex mode of operation, and can be useful when running half-duplex communication protocols, such as IrDA. The transceiver can also be configured to operate in a full-duplex mode, where the device can transmit and receive optical signals at the same time.

FIG. 5A illustrates an exemplary wireless optical transceiver. As with the receiver and transmitter designs described above, the transceiver includes an opaque element 18 having a concave reflective surface. The reflective surface 18 is arranged in a path of each of an outgoing light signal, generated by an emitter 39, and an incoming light signal 57. The reflective surface 18 is configured to redirect the paths of the respective light signals. The emitter 39 and detector 20 are arranged facing the reflective surface 18. In the transceiver shown, the optical detector 20 and the emitter 39 are preferably placed in relatively close proximity to one another. For example, the emitter 39 can be bonded to the active region of the detector 20 to improve the optical efficiency of the transceiver. The transceiver will exhibit favorable performance levels when the two elements are arranged as closely together as possible.

Other arrangements can include arrays of emitters meshed with arrays of detectors (described below in greater detail). A less complicated design can place the detector 20 and emitter 39 in a side-by-side arrangement as closely together as is practical. When the emitter 39 and the detector 20 share a focal point of the transceiver, the incoming signal light 57 can be redirected onto the detector 20 from a same location on the reflective surface 18 that the outgoing light signal generated by the emitter 39 can be launched toward the reflective surface 18 for retransmission into free space. Consequently, the transmitter and receiver portions of the transceiver can be said to share the same field of view, meaning that the transmit and receive functions share a same transmission medium. Such an arrangement allows for bidirectional communication between the transceiver and a distant transmitter/receiver using the shared transmission medium, for example free space.

The transceiver shown in FIG. 5A includes a lens assembly 54 arranged between the reflective surface of the opaque element 18 and both the optical detector 20 and the emitter 39. The lens assembly 54 is configured to couple the redirected incoming light signal 57 to the optical detector 20 and to couple the outgoing light signal generated by the emitter 39 to the reflective surface 18. FIG. 5B details the lens assembly 54 according to an exemplary embodiment. In the figure, the emitter 39 is shown to generate the outgoing light signal 66 that can be aligned by a first lens 67. A wavelength selective filter 68 can be arranged in the path of the outgoing light signal 66 to selectively pass at least one wavelength component of the aligned signal 66. The aligned and filtered light signal 66 can be passed through a secondary lens 69 configured to spread the generated light signal substantially over the entire reflective surface of the opaque element 18. The spread light signal can then be redirected off of the reflective surface 18 to form the outgoing light signal 58 that can be directed toward a distant receiver over a transmission medium, for example free space.

Continuing with the exemplary embodiment shown in FIG. 5B, the incoming signal light 57 can be redirected from the reflective surface 18 through the secondary lens 69 configured to align the redirected light signal. The aligned light signal can be passed through the wavelength filter 68 to selective pass at least one wavelength of the aligned signal. The filtered and aligned signal can then be passed through the first lens 67 configured to focus the incoming light signal onto a portion of the optical detector 20.

The transceiver shown in FIG. 5A can also include circuitry similar to that described above in conjunction with the receiver and transmitter shown in FIGS. 3A and 4A, respectively. A shared circuit board 59 can include both the transmit and receive circuitry described above, as well as a line driver and line receiver 60, or an optical transmit and receive interface that will relay the transmit and receive signals over a transmission line or a fiber optic cable. FIG. 5A shows independent cables 61, 62 used to carry the transmit and receive signals to and from the transceiver. Alternatively, suitable electronics and fiber optic devices can be employed in the design to carry the transmit and receive signals over a same cable. This can be accomplished by using a receive signal having a different wavelength than the transmit signal if a signal optical fiber cable is used, or by using independent frequency bands for the receive and transmit signal when a single transmission line is used. An RF interface can be used to replaces the cables 61, 62, and can be particularly well suited when operating the transceiver in the half-duplex mode.

The transceiver can include a similar mechanical arrangement of the carrier 25, mounting assembly 24, and focusing mechanism described in detail above in conjunction with the optical receiver and transmitter shown in FIGS. 3A and 4A, respectively. The arrangement and focusing mechanism can be configured to vary a position of the lens assembly 54 in relation to the reflective surface 18 to change both the concentration of the generated outgoing light signal coupled to the reflective surface 18 and the concentration of the redirected incoming light signal coupled to the optical detector 20. As such, the mechanical arrangement can be used to simultaneously adjust both the transmit and receive fields of view. Alternatively, the emitter 39 and detector 20 can be arranged on their own respective adjustment mechanisms to provide for individual adjustment of the transmit and receive fields of view.

To operate the transceiver shown in FIG. 5A in the full-duplex mode, the paths of the outgoing light signal generated by the emitter 39 and the incoming light signal redirected to the detector 20 should be optically isolated from one other. Isolating the paths of the outgoing and incoming light signals from one another can allow the emitter 39 and the optical detector 20 to occupy a focal point of the transceiver corresponding to a region of the reflective surface from where the outgoing and incoming light signals are substantially redirected. Such an arrangement can allow the outgoing and incoming light signals to travel coaxially in a shared transmission medium, such as free space.

Means for isolating the paths of the outgoing and incoming light signals from one another can include an opaque material arranged on a portion of the reflective surface 74 where the outgoing light signal generated by the emitter 39 can be redirected toward the optical detector 20. The opaque "material" can include simply leaving a hole in the reflective surface 18 or adding etching or grating near the portion 74 of the surface 18 where the two paths meet. Alternatively, a first opaque object 73 can be arranged between the emitter 39 and the reflective surface 18 to block a path of the outgoing light signal that can be redirected toward the optical detector, e.g., a path directed toward the portion 74 of the surface 18. In addition, a second opaque object 75 can be arranged between the emitter 39 and the optical detector 20 to block parasitic or unintentional paths between the optical elements. Other means for isolating the paths of the outgoing and incoming light signals from one another can include a wavelength of emission used by the emitter that lies outside a range of wavelengths detectable by the optical detector. In this way, the optical detector 20 can be said to be "blind" to the emissions of the emitter 20.

Figure 6:
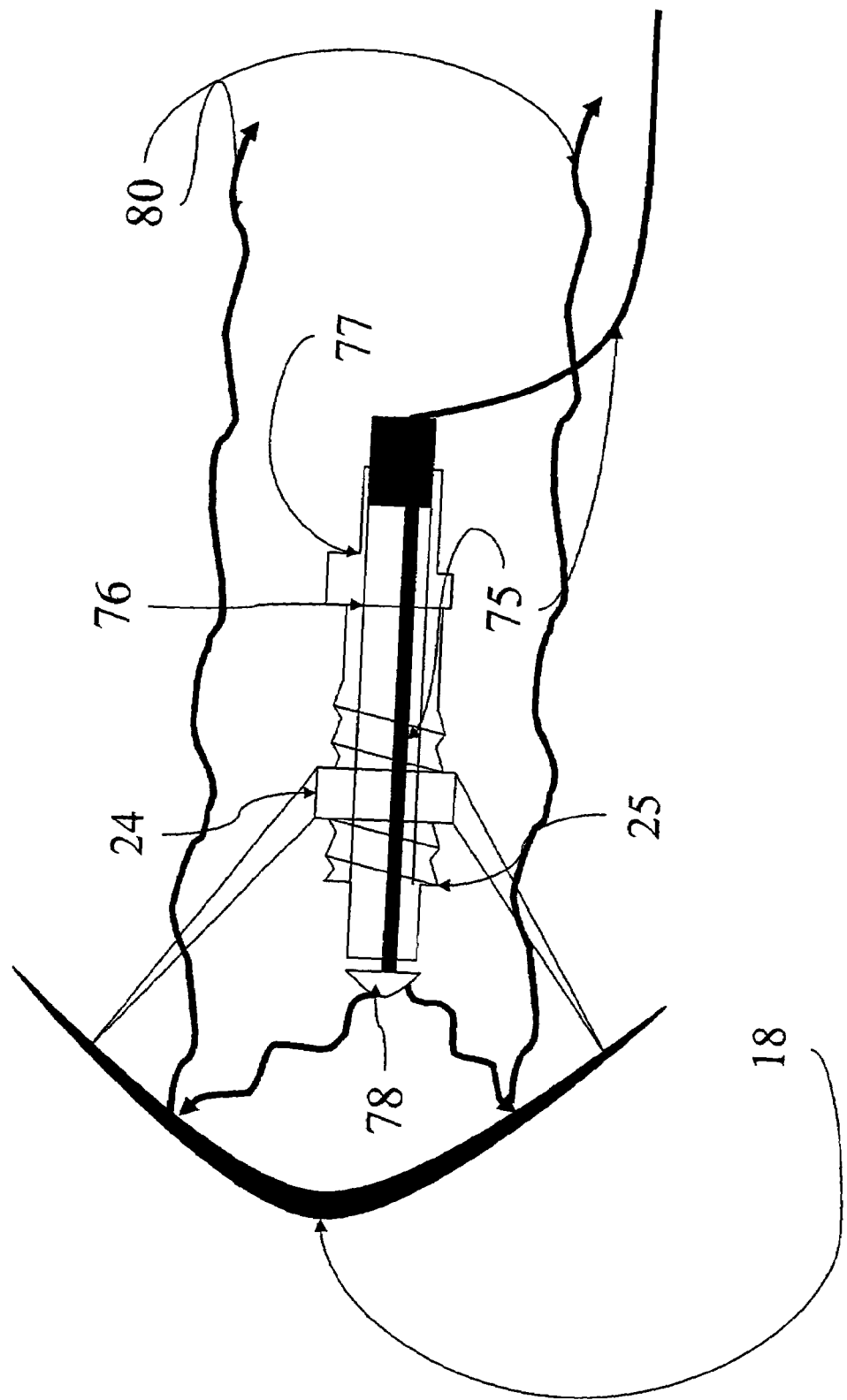
FIG. 6 illustrates an optical coupler for coupling a light signal into or out of a fiber optical cable.

FIG. 6 illustrates an optical coupler for coupling light signals between different transmission media. The bipolar nature of the light traveling through an optical system allows the same arrangement to be used to couple lights signals between the transmission media in both directions, either independently or simultaneously. Although the figure only shows light being coupled in one direction, for example from a fiber optic cable 75 to free space, the skilled artisan will be able to readily understand from the description that follows the manner in which light can be coupled by the arrangement in the opposite direction.

The optical coupler of FIG. 6 includes an opaque element 18 having a concave reflective surface arranged in a path of each of an outgoing light signal carried over a fiber optic cable 75 and an incoming light signal (not shown) carried over free space. The reflective surface is configured to redirect the paths of the respective light signals. The coupler includes a lens assembly 78 arranged between the reflective surface of the opaque element 18 and the fiber optic cable 75. The lens assembly 78 is configured to couple the outgoing light signal from the fiber optic cable 75 to the reflective surface 18 and to couple a redirected incoming light signal (not shown) from the reflective surface 18 to the fiber optic cable 75. The lens assembly 78 can include lens to focus and align the light signals passing through the assembly, and can also include a wavelength specific filter to selectively pass at least one wavelength of the coupled signals as described in conjunction with the other embodiments discussed above. A redirected outgoing light signal 80 from the reflective surface of the opaque element 18 can be carried over free space.

The fiber optic cable 75 can be secured to a mechanical arrangement including the carrier 25, mounting assembly 24, and focusing mechanism described in conjunction with optical receiver and transmitter of FIGS. 3A and 4A, respectively. The mechanical assembly 24, 25 that secures the cable 75 can differ from the structures described above in that the assembly need not be configured to house electronics. As such, the assembly 24, 25 can be smaller and perhaps less complicated in its design than the corresponding assemblies of the above-described arrangements.

To allow the coupler to simultaneously couple the incoming and outgoing optical signals between the different transmission media, the coupler can include means for isolating the paths of the outgoing and incoming light signals from one another, such as the opaque material arranged on a portion of the reflective surface 74 where the outgoing light signal can be redirected back into the lens assembly 78. Again, the opaque "material" can include simply leaving a hole in the reflective surface 18 or adding etching or grating near the portion 74 of the surface 18. Alternatively, a first opaque object 73 can be arranged between to block a path of the outgoing light signal that can be redirected back toward the lens assembly 78.

Figure 1:
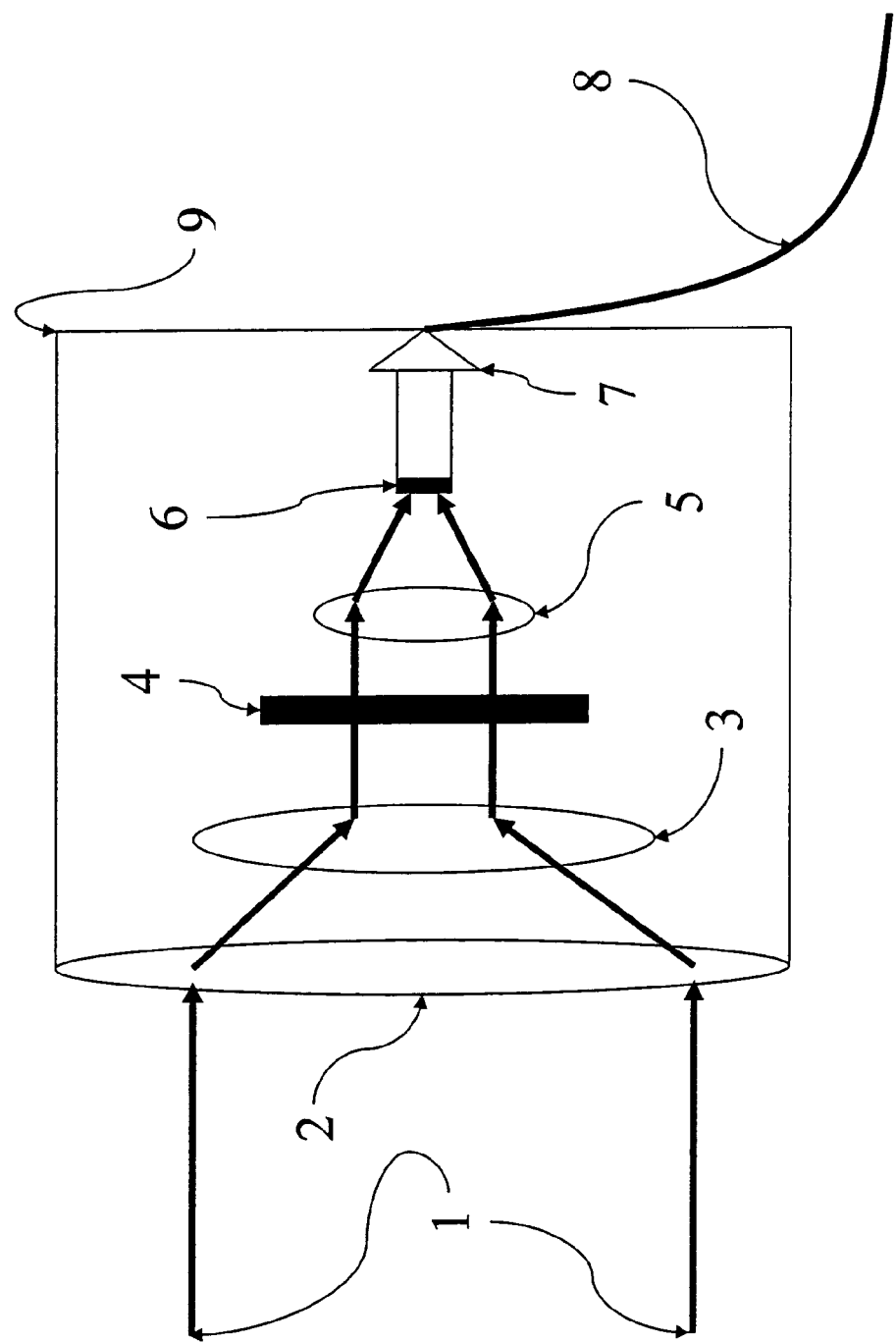
FIG. 1 illustrates a lensed optical receiver for use in a wireless optical communication system.
Figure 7:
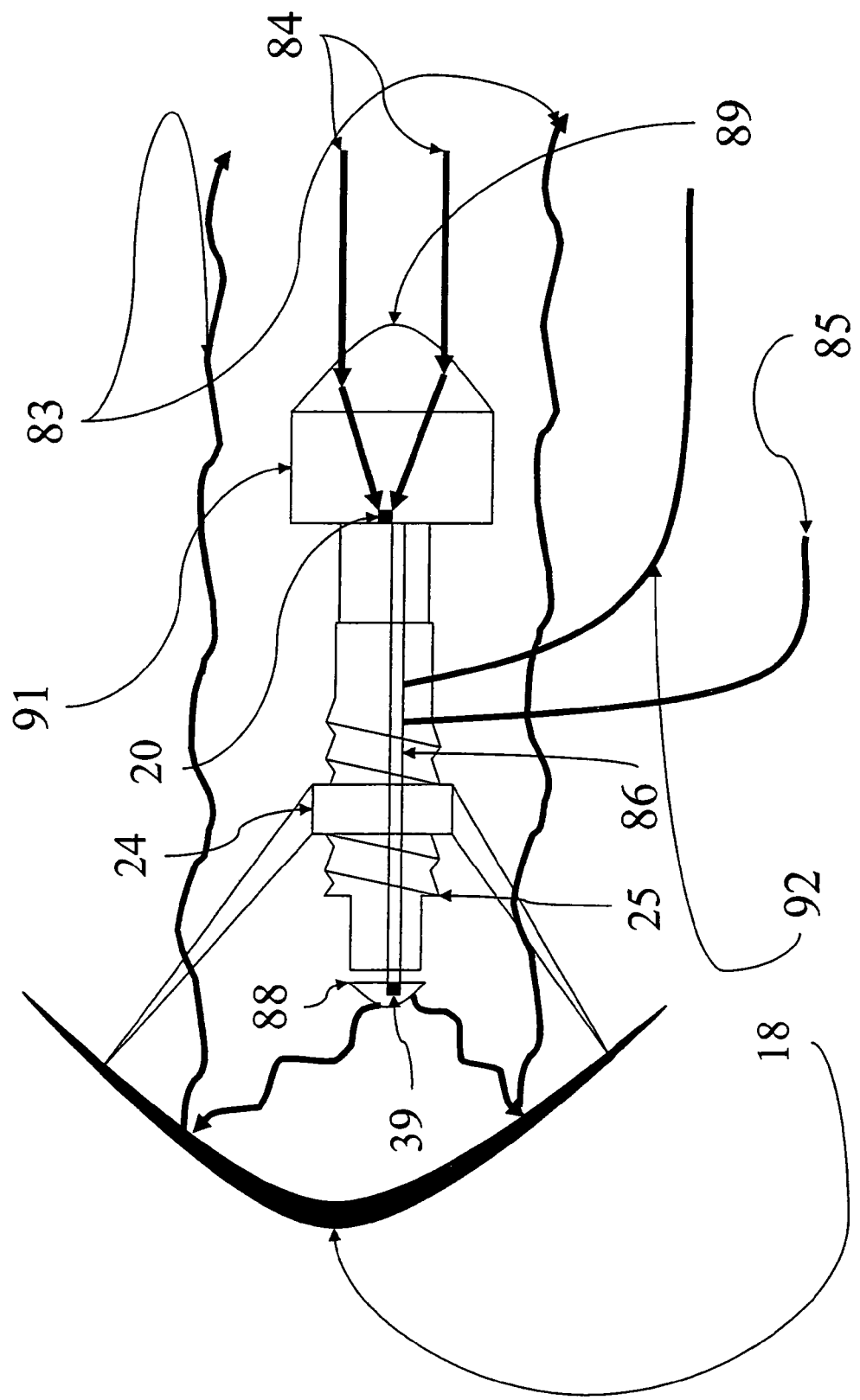
FIG. 7 illustrates a large transmit area reflector-based transceiver.

FIG. 7 illustrates an optical transceiver according to another exemplary embodiment. The arrangement combines the opaque reflector-based transmitter described in conjunction with FIGS. 4A–4C with the lensed optical receiver described in conjunction with FIG. 1. The transceiver includes an emitter 39 configured to generate an outgoing light signal proportional to a transmit signal. An opaque element 18 is included having a concave reflective surface arranged facing the emitter 39 in a path of the outgoing light signal. The reflective surface 18 is configured to redirect the path of the generated outgoing light signal for launching an output beam 83 toward a distant receiver.

The transceiver further includes a first lens assembly 88 arranged between the reflective surface 18 and the emitter 39. The first lens assembly 88 is configured to couple the generated outgoing light signal from the emitter 39 to the reflective surface 18. The first lens assembly includes elements similar in function to the optics described above in conjunction with lens assemblies shown in FIGS. 4B and 4C. An optical detector 20 is arranged facing away from the reflective surface 18 in a path of an incoming light signal 84. The optical detector 20 is configured to detect the incoming light signal 84 and to generate a corresponding receive signal proportional to the light energy in the signal 84. A second lens assembly 89 is arranged between the optical detector 20 and a distant transmitter (not shown) of the incoming light signal 84. The second lens assembly 89 is configured to couple the incoming light signal to the optical detector 20, and can include elements similar to the optics described in conjunction with the arrangement shown in FIG. 1.

The transceiver can also include a mechanical arrangement including the carrier 25, mounting assembly 24, and focusing mechanism described above in conjunction with the transmitter of FIG. 4A. The arrangement 24, 25 can include a enclosure 91 that aligns and positions the second lens assembly 89. The enclosure 91 can also be configured to position the field of view for the lensed receiver portion of the transceiver to be coaxial with the field of view of the reflector-based transmitter portion. This can better ensure that the transceiver can communicate simultaneously with a distant transmitter/receiver pair (not shown) occupying a same free-space optical channel. When the receiver and transmitter fields of view are coaxial with one another, the mechanical arrangement 24, 25, can be used to simultaneously vary the focus of the reflector-based transmitter portion. Alternatively, separate adjustment mechanisms can be used for the transmit and receive portions of the transceiver.

The transceiver shown in FIG. 7 can also include circuitry similar to that described above in conjunction with the receiver and transmitter shown in FIGS. 3A and 4A, respectively. A shared circuit board 86 can include both the transmit and receive circuitry described above, as well as a line driver and line receiver, or an optical transmit and receive interface that will relay the transmit and receive signals over a transmission line or a fiber optic cable 85, 92. Again, independent cables are shown in the figure, but it will be understood that suitable electronics and fiber optic devices can be employed in the design to carry the transmit and receive signals over a same cable.

Figure 8:
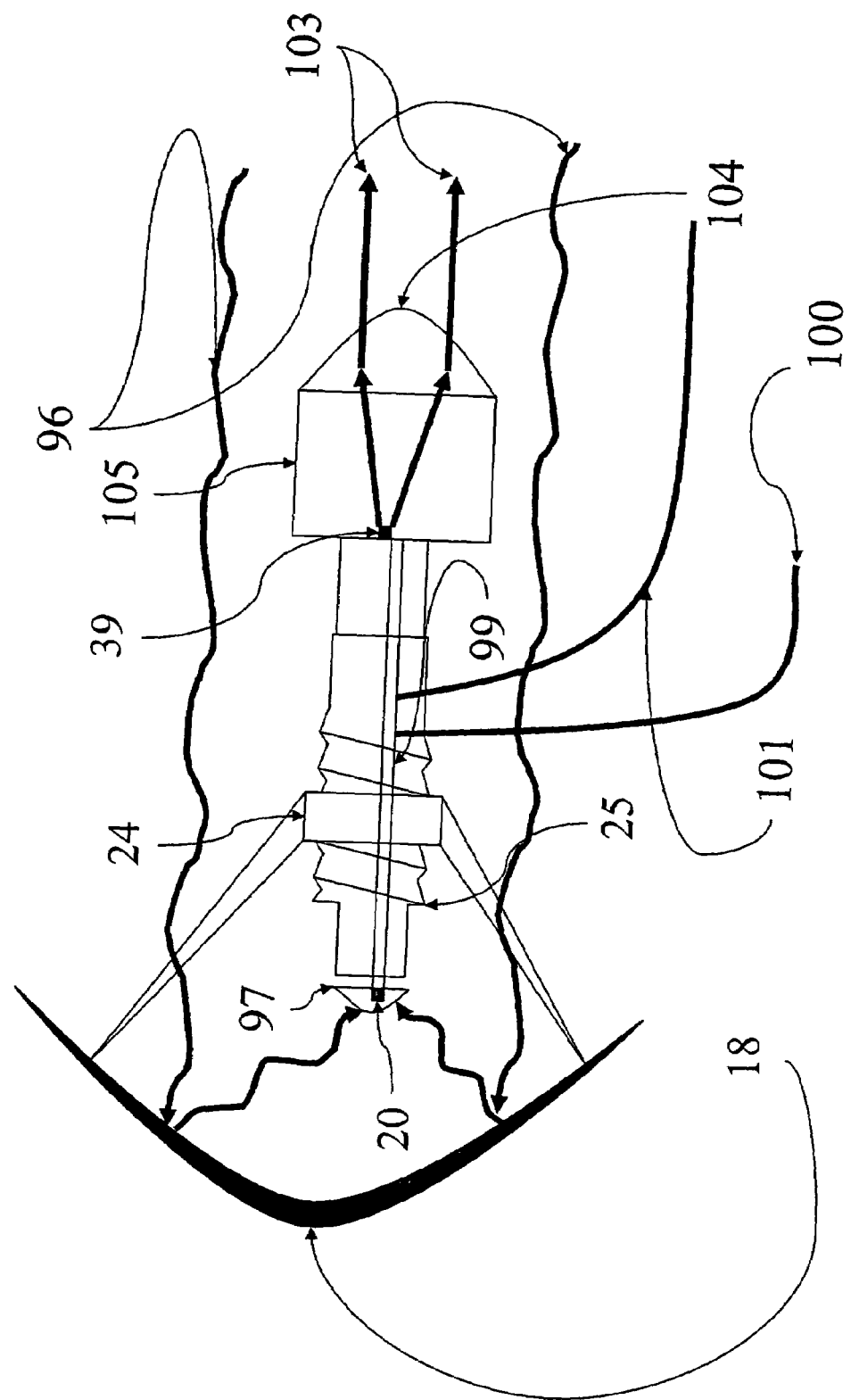
FIG. 8 illustrates a large receive aperture reflector-based transceiver.

FIG. 8 illustrates yet another optical transceiver according to an exemplary embodiment. The arrangement of FIG. 8 combines the opaque reflector-based receiver described in conjunction with FIGS. 3A–3C with the lensed optical transmitter described in conjunction with FIG. 2. The arrangement offers performance and cost advantages over the arrangement shown in FIG. 7. Often, a large transmitter objective lens does not add meaningfully to the performance of the transmitter. In contrast, a large receiver objective lens increases performance considerably. But a large objective lens can add considerable cost and complexity to the receiver design. Thus, there is a motivation to design transceivers with a large receive area and a moderate transmit area. The transceiver arrangement of FIG. 8 achieves this goal by replacing the relatively large objective lens 89 included in the arrangement of FIG. 7 with a relatively inexpensive opaque reflector 18. A smaller lens 104 can be used in the transmitter portion of the arrangement. In addition, unused space in the center of the receiver portion can be used to house the transmitting device leading to an overall efficient and compact design.

The transceiver includes an opaque objective element 18 having a concave reflective surface arranged in a path of an incoming light signal 96. The reflective surface 18 is configured to redirect the path of the incoming light signal. An optical detector 20 is arranged facing the reflective surface 18. The optical detector is configured to detect a redirected incoming light signal from the reflective surface 18, and to generate therefrom a receive signal proportional to the incoming light signal 96. The transceiver includes a first lens assembly 97 arranged between the reflective surface 18 and the optical detector 20. The first lens assembly is configured to couple the redirected incoming light signal 96 to the optical detector 20, and can include optics as described in conjunction with the lens assemblies described in FIGS. 3B and 3C.

An emitter 39 is arranged facing away from the reflective surface 18. The emitter 39 is configured to generate an outgoing light signal 103 proportional to a transmit signal. A second lens assembly 104 is configured to couple the outgoing light signal to a transmission medium, for example free space, between the emitter 39 and a distant receiver (not shown) of the outgoing light signal 103. The transceiver can also include a mechanical arrangement including the carrier 25, mounting assembly 24, and focusing mechanism described above in conjunction with the receiver of FIG. 3A. The arrangement 24, 25 can include a enclosure 105 that aligns and positions the second lens assembly 104. The enclosure 105 can also be configured to position the field of view for the lensed transmitter portion of the transceiver to be coaxial with the field of view of the reflector-based receiver portion of the system.

The transceiver can also include circuitry similar to that described above in conjunction with the receiver and transmitter shown in FIGS. 3A and 4A, respectively. A shared circuit board 99 can include both the transmit and receive circuitry described above, as well as a line driver and line receiver, or an optical transmit and receive interface that will relay the transmit and receive signals over a transmission line or a fiber optic cable 100, 101, or over a shared cable as described above.

Figure 9:
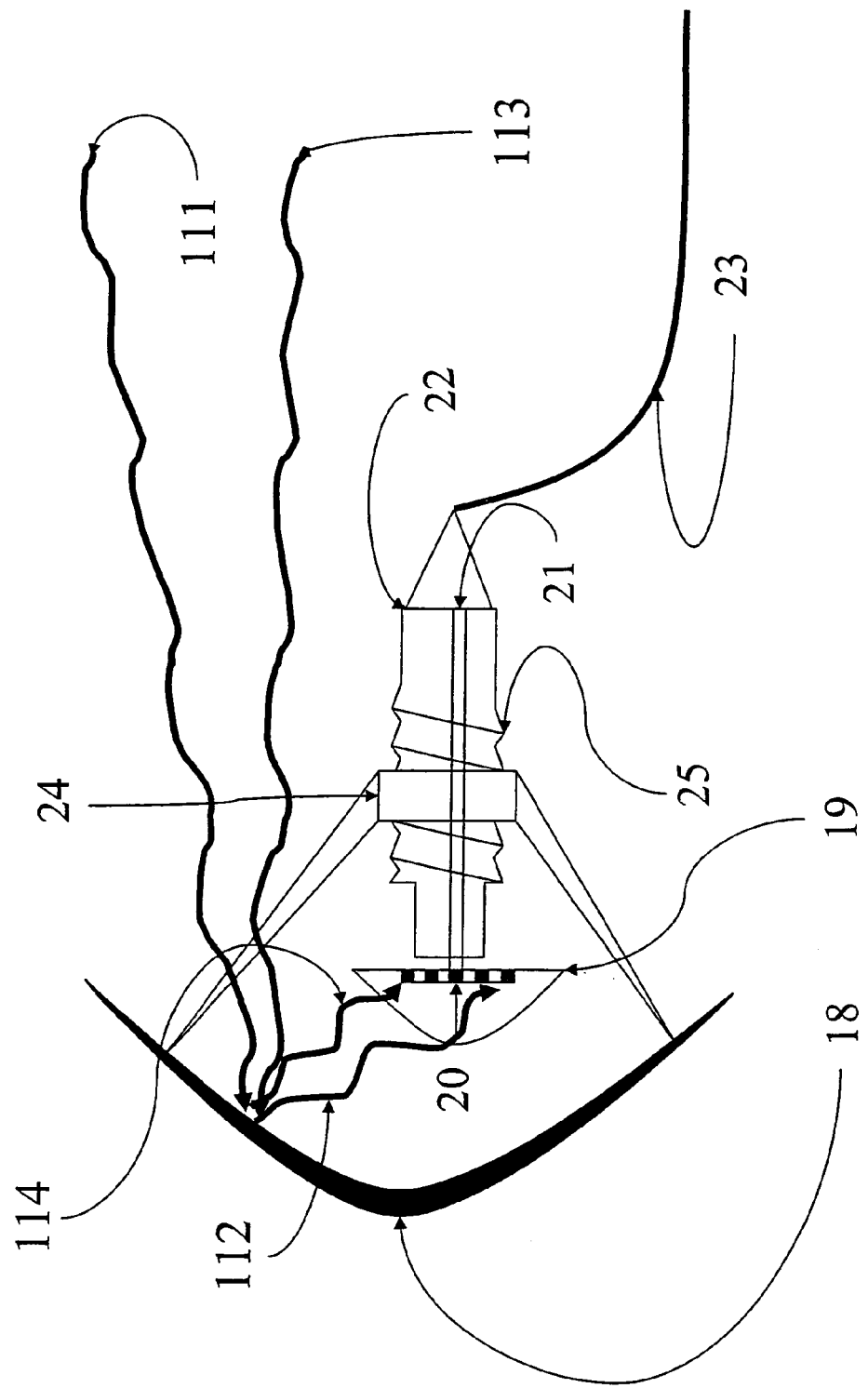
FIG. 9 illustrates a reflector-based directional receiver using a multi-element detector array.

FIG. 9 illustrates the use of a plurality of optical detectors 20 to form a multi-element receiver. The optical detectors 20 can be configured to detect respective portions 112, 114 of the redirected light signal 111, 113 reflected at different angles from the reflective surface 18. Each detector 20 can be configured to generate a receive signal proportional to the portion 112, 114 of the redirected light signal 111, 113 detected by the respective detector 20. The receiver can include circuitry coupled to the plurality of optical detectors 20 configured to determine directional information associated with the light signal based on respective amplitudes of the generated receive signals. For example, if the amplitude of the generated receive signal corresponding to the reflected signal 112 is greater than that corresponding to reflected signal 114, a determination can be made that the incoming light signal is primarily concentrated in the direction of the portion 111 of the incoming signal. A multi-element receiver can also be used to increase the field of view of the receiver, which in turn can ease the alignment requirements between the receiver and a distant transmitter (not shown). IN addition, such a receiver can or improve noise performance by averaging or computing an autocorrelation of the signals from the different detectors 20.

Multiple detectors 20 can be arranged in any of the receivers/transceivers shown in FIGS. 3A, 5A, 7 and 8, the remaining components of which need not be described again here in detail. One or several line drivers or optic fiber interfaces 22 can be used to relay the receive signal(s) down one or several transmission lines or optical cables 23. Having several cables can be useful if the signal from each element is individually relayed down the cable. A variation of coupler shown in FIG. 6 can be used to construct a version of the multi-element receiver that can couple light directly into an optical fiber. Finally, the multi-element receiver shown can exhibit the advantage of being able to select regions of free space from which the device can receive different signals, making the receiver it a tunable directional receiver. By selectively polling certain elements in the array of detectors 20, the receiver can view or ignore particular locations in space.

Figure 10:
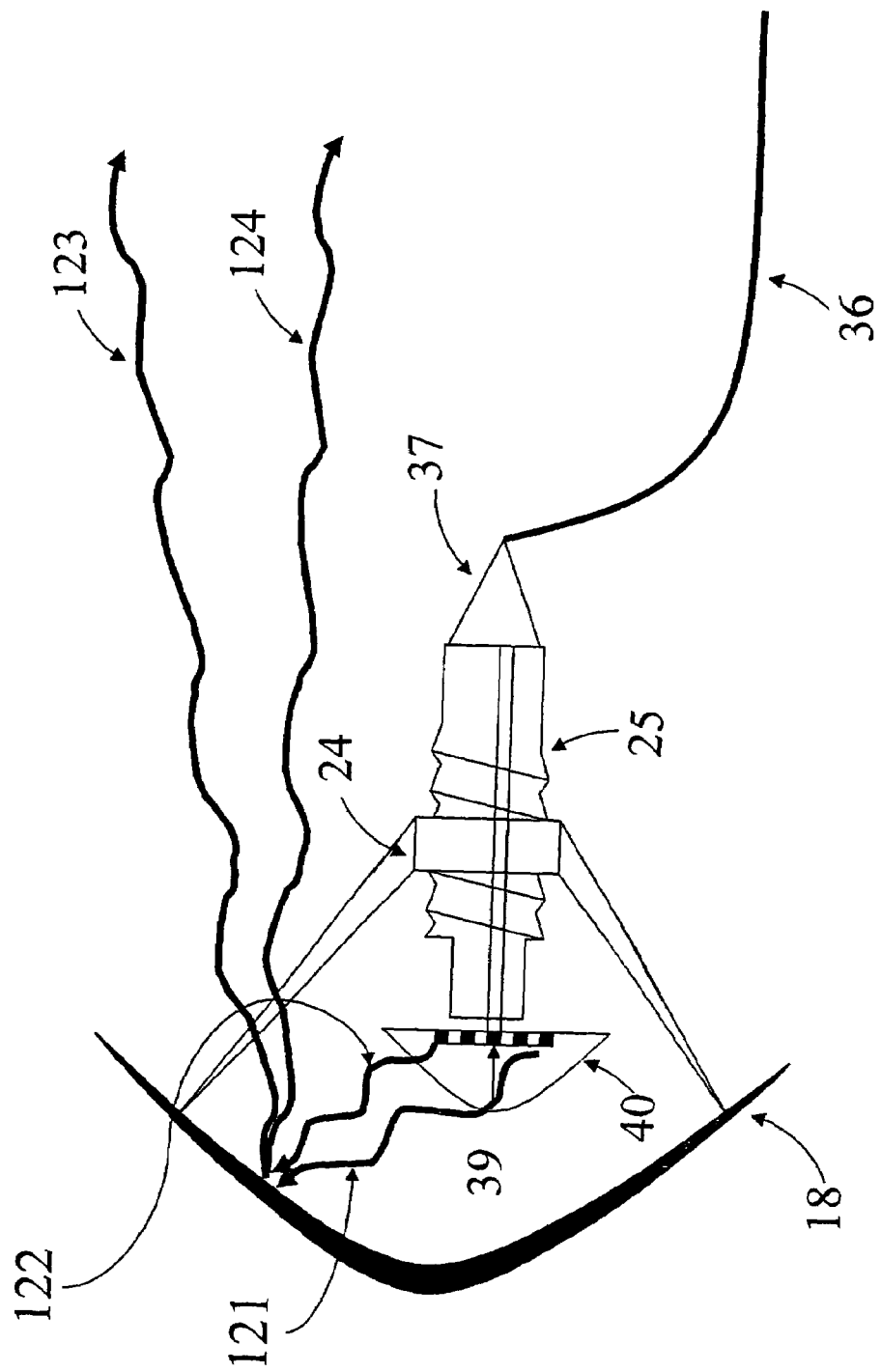
FIG. 10 illustrates a reflector-based directional transmitter using a multi-element emitter array.

Similar to the arrangement describe above, FIG. 10 illustrates the use of a plurality of optical emitters 39 to form a multi-element transmitter. In the arrangement, respective light signals 121, 122, emitted from each emitter 39 are redirected over respective paths 123, 124 into free space from the reflective surface 18. Such a multi-element transmitter can be useful in applications requiring a greater divergence angle of transmission without significantly impacting the overall power density of the transmitted beam. Also, by selectively transmitting with certain emitters 39, the transmitter can be configured to operate as a tunable directional transmitter. The elements described in conjunction with the multi-element receiver shown in FIG. 9 are either similar or analogous to those used the multi-element transmitter shown, and will not be described here again in detail. The arrangement can be used in the transmitters/transceivers shown in FIGS. 4A, 5A, 7 and 8.

According to an exemplary embodiment, any of the transceivers describe above can be configured to include an acoustical signal generator (not shown) arranged near a focal point of the reflective surface of the opaque element 18. The acoustical signal generator can be configured to launch an acoustical signal in a direction of a distant receiver. Similarly, the transceiver described above can include an acoustical signal detector (not shown) arranged near the focal point of the reflective surface of the opaque element 18. The acoustical signal detector configured to detect an acoustical signal launched from a distant transmitter.

An acoustical generator placed at the focal point of a reflector can launch an acoustical signal that is similar in properties to the optical signals described above, except that acoustical signals generally cannot penetrate glass and other transparent sources, and the frequency of the carrier wave can be significantly lower than frequency of light. For targeting applications and low frequency data communications, acoustical large area parabolic transmitters and receivers can present cost and simplicity advantages over optical systems. These systems can be used in much the same way as the optical transmitters and receivers described above. By using one frequency or frequency band to transmit and another band to receive, an acoustical generator having a single large-area reflector can be made to operate in full-duplex mode with a complementary device over a distance. Using an array of microphone elements such as those capable my micromachining on silicon, a directional receiver can be implemented and used in much the same way as the optical multi-element receiver described above.

In each of the embodiments described above, the opaque element 18 having the reflective surface can be configured to be collapsed into a smaller form factor when the transceiver is not in use, relative to a form factor of the opaque element when the transceiver is in use. For example, the opaque element 18 can be configured to operate in much the same way as that of a rain umbrella. The element 18 can have a smooth, optical surface that can focus onto a detector or project a light signal emitted by an emitter accurately when the element 18 is fully opened or deployed. A lens or lens assembly between the reflector and the emitter or the reflector and the detector aids in the accurate and efficient transmission or collection of signal power.

Operating in two modes, the reflector allows transmission or reception or both over a very long distance while it is open. When drawn close, the reflector becomes compact, much like an umbrella, for storage or transportation. This dual capability is especially important in temporary deployments such concerts, parks and other events for the transmission and reception of voice, audio or data signals. Using a transmitter on each side of a communication link can enables full-duplex operation as described above, and in the following examples. A collapsible optical antenna can offer portability in a range of simplex, half-duplex and full-duplex communication applications.

A number of specific illustrative examples consistent with the principles of the present invention will now be described. These examples are intended as illustrative, and should not be consider restrictive in any way.

EXAMPLE 1

One-Way Transmission Using Dedicated Transmitter/Receiver

Figure 11:
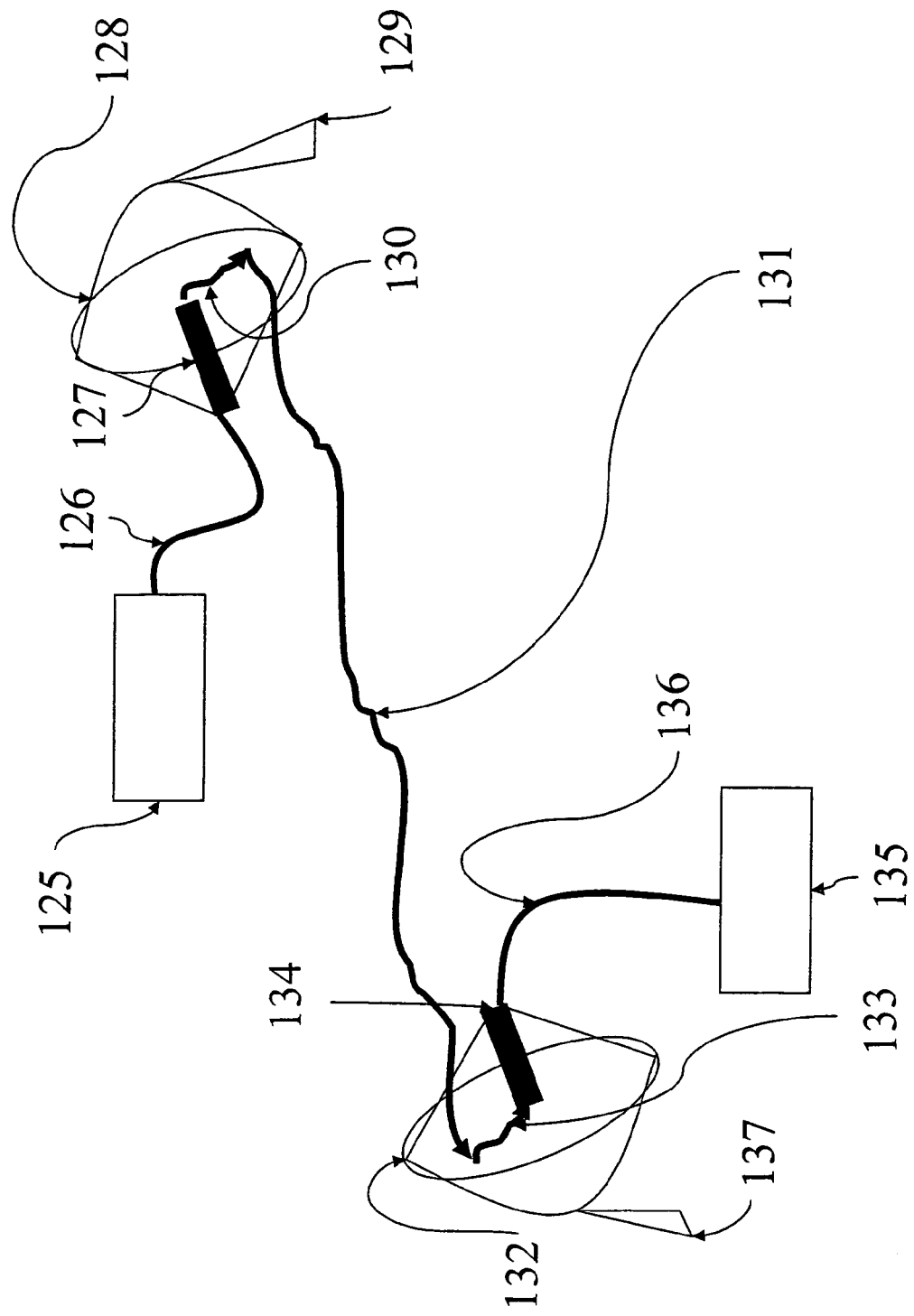
FIG. 11 illustrates reflector-based simplex transmission.

FIG. 11 illustrates an arrangement for performing one-way transmission in which a dedicated transmitter and a dedicated receiver of the types described here can communicate with each other. The system can be adapted to transmit any kind of data or signal that does not require a return path. The arrangement includes a source 125, a connection 126 from the source to the transmitter which can be optical fiber, copper cable, RF or optical wireless connection, a transmitter assembly 127 that receives a signal from the source and emits a corresponding signal 128, an opaque element having a reflective surface 129 that launches the signal, a stationary support structure 130 which maintains alignment, an optical signal 131 that is emitted by the transmitter assembly, and a reflected transmitter signal 132 that is launched toward a receiver having an objective element with a reflective surface 133. A redirected signal 134 strikes a receiver assembly 135 and is relayed to its destination 136 via a copper, wireless or optical fiber connection 137. A stationary support structure 138 maintains alignment of the transmitter with the receiver.

The arrangement shown in FIG. 11 is particularly suited for broadcast or one-way traffic, such as digital audio signals or digital video signals. The source can be a compact disc player, an analog to digital interface, such as the Sony/Philips Digital Interface (S/PDIF), or other digital converter device or a digital video disc player. The destination can be a digital audio receiver or a digital to analog converter for audio applications. Other sources and destinations include digital video sources such as those compliant with digital video formats. Analog audio and video signals can also be transmitted using appropriate circuitry known to those skilled in the art.

EXAMPLE 2

Full-Duplex or Half-Duplex Transmission using Separate Transceivers

Figure 12:
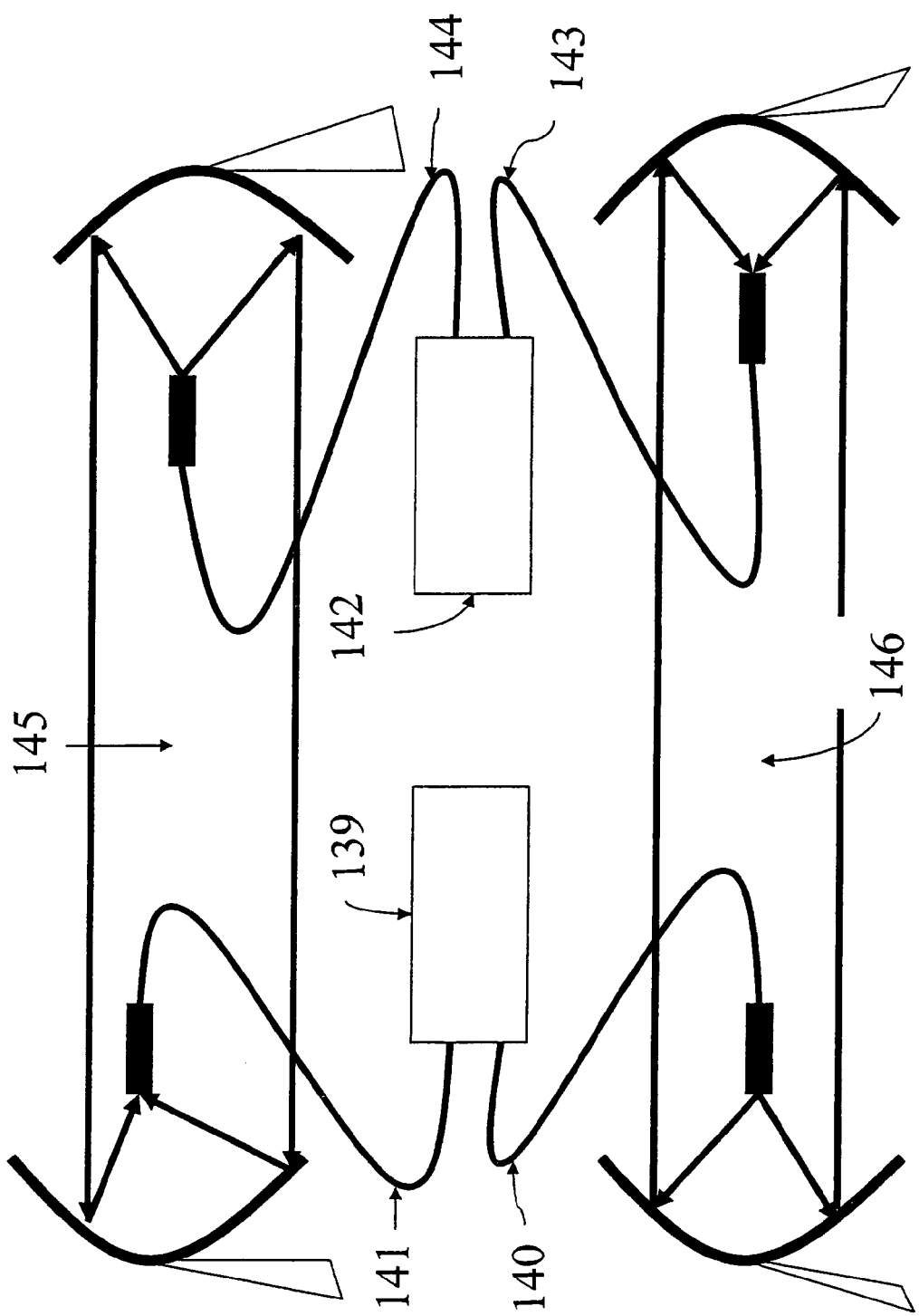
FIG. 12 illustrates reflector-based duplex transmission.

FIG. 12 illustrates an arrangement for performing full-duplex or half-duplex transmission. Each side of a communication channel has at least one receiver and at least one transmitter, or at least one transceiver, as described here. The arrangement includes at least two source components. A first source component 139 having an independent transmit 140 and an independent receive connection 141 communicates with a second source component 142 having independent receive 143 and transmit 144 connections. The simultaneous use of the two transceivers allows for full-duplex transmission by establishing two one-way traffic channels. A fist traffic channel 146 carries information transmitted from the first source component 139 to the second source component 142, and a second traffic channel 145 carries information transmitted from the second source component 142 to the first source component 139.

EXAMPLE 3

Distinguishing the Origin of Transmission Signals from Distant Transmitters

Figure 13:
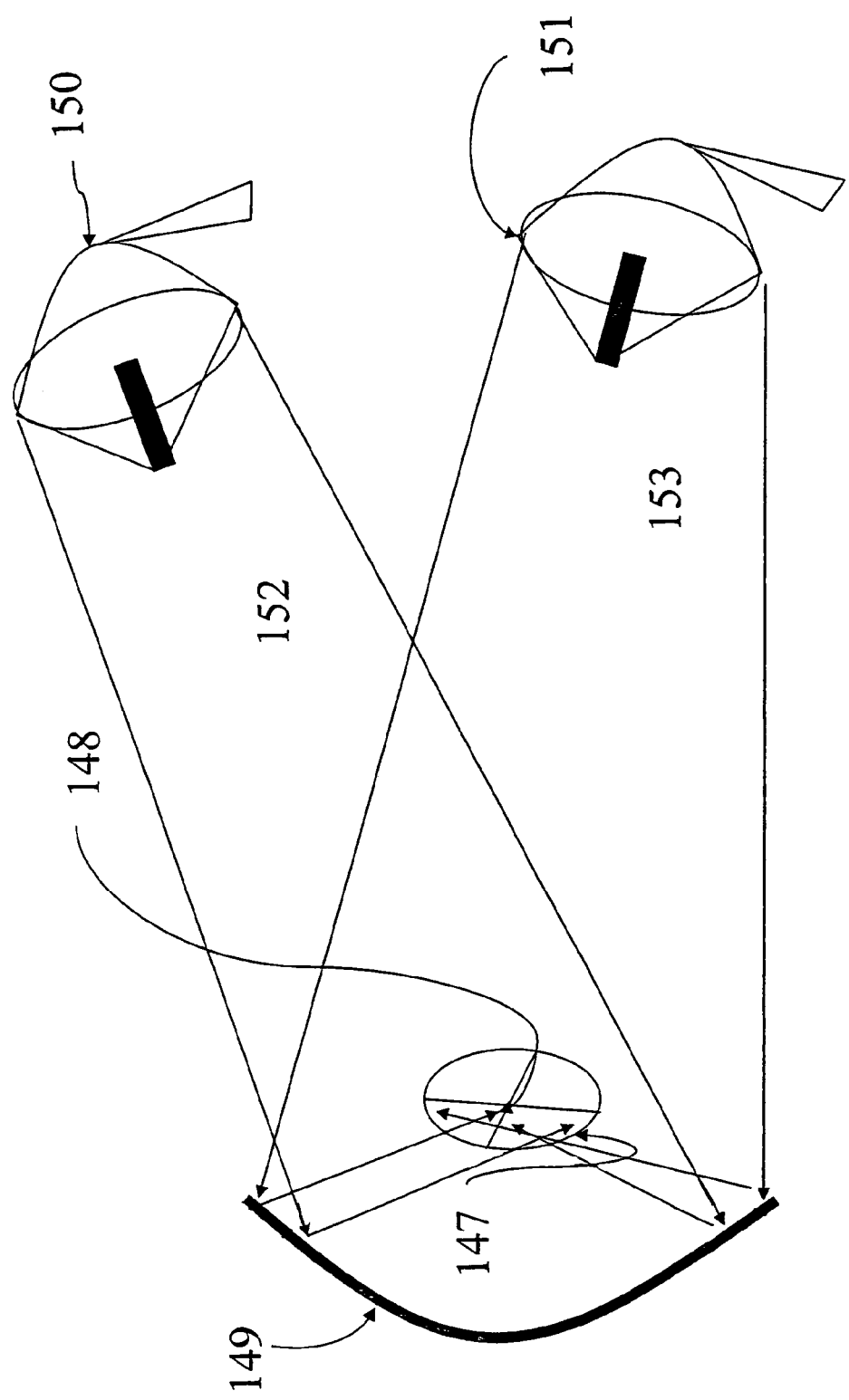
FIG. 13 illustrates reflector-based angular detection.

FIG. 13 illustrates an arrangement for distinguishing the origin of transmission signals from distant transmitters. In the arrangement a receiver, such as any of those described above, can be configured to have multiple detectors arranged in a plurality of quadrants. An arrangement having a first quadrant 147 and a second quadrant 148 can be configured to discern between a first distant transmitter 150 and a second distant transmitter 151 by utilizing the angular properties of the receiver 149 reflector. For example, in the arrangement shown, a first beam 152 from the first transmitter 150 and the second beam 153 from the second transmitter 151 arrive at the receiver 149 at different angles. Consequently, the beams will be redirected from the reflective surface of the receiver 149 in different directions.

An image of each of the redirected signals can appear in different proportions on each of the quadrants of the detector. Sum and difference amplifier circuitry can be used to determine the incoming angle of the beams. To distinguish between the transmitters, each transmitter signal can occupy a respective frequency channel. With such an arrangement, the receiver 149 can be configured to rotate until the energy of the intended source is equally distributed between the quadrants of the detector, at which point he receiver 149 will be aligned to the desired transmitter. An absolute measure of the angle that each incoming beam makes with respect to a plane perpendicular to the optical axis of the system can be arrived at by reading the difference in amplitude between adjacent quadrants of the detector.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. An optical receiver for receiving a light signal, comprising:
   an opaque objective element having a concave reflective surface arranged in a path of the light signal, the reflective surface configured to redirect the path of the light signal;
   an optical detector arranged facing the reflective surface, the optical detector configured to detect a redirected light signal from the reflective surface and to generate therefrom a receive signal proportional to the light signal;
   a lens assembly arranged between the reflective surface and the optical detector, the lens assembly configured to couple the redirected light signal to the optical detector;
   a carrier encapsulating the optical detector and the lens assembly;
   a mounting assembly configured to moveably attach the carrier to the objective element; and
   a focusing mechanism configured to vary a position of the lens assembly in relation to the reflective surface to change a concentration of the redirected light signal coupled to the optical detector.

2. The optical receiver of claim 1, wherein the lens assembly comprises:
   a first lens configured to align portions of the redirected light signal from the reflective surface of the objective element;
   a wavelength filter configured to selectively pass at least one wavelength component of the aligned portions of the redirected light signal; and
   a second lens configured to focus the aligned and filtered portions of the redirected light signal onto a portion of the optical detector.

3. The optical receiver of claim 1, wherein the lens assembly comprises:
   a lens encapsulating the optical detector, the encapsulating lens including a wavelength filter configured to selectively pass at least one wavelength component of the redirected light signal to the optical detector.

4. The optical receiver of claim 1, wherein the focusing mechanism comprises:
   a first screw thread disposed on an external surface of a substantially cylindrical or conical portion of the carrier; and
   a second screw thread disposed on an internal surface of a corresponding and substantially cylindrical or conical portion of the mounting assembly;
   wherein the concentration of the redirected light signal coupled to the optical detector can be changed by rotating the carrier in relation to the mounting assembly when the first and second screw threads are engaged to vary the position of the lens assembly in relation to the reflective surface of the objective element.

5. The optical receiver of claim 1, comprising:
   circuitry configured to condition the receive signal generated by the optical detector for transmission over a transmission medium; and
   a driver configured to transmit the conditioned receive signal over the transmission medium;
   wherein the circuitry and driver are encapsulated in the carrier.

6. The optical receiver of claim 1, wherein the reflective surface of the objective element is aspheric.

7. The optical receiver of claim 1, wherein the reflective surface of the objective element is parabolic.

8. The optical receiver of claim 1, wherein the reflective surface is configured to selectively redirect at least one wavelength component of the light signal.

9. The optical receiver of claim 1, comprising:
   a plurality of optical detectors arranged facing the reflective surface, the optical detectors configured to detect respective portions of the redirected light signal reflected at different angles from the reflective surface, each detector configured to generate a receive signal proportional to the portion of the redirected light signal detected by the respective detector.

10. The optical receiver of claim 9, comprising:
    circuitry coupled to the plurality of optical detectors configured to determine directional information associated with the light signal based on respective amplitudes of the generated receive signals.

11. An optical transmitter for transmitting a light signal, comprising:
    an emitter configured to generate a light signal proportional to a transmit signal;
    an opaque element having a concave reflective surface arranged facing the emitter in a path of the generated light signal, the reflective surface configured to redirect the path of the generated light signal;
    a lens assembly arranged between the reflective surface of the opaque element and the emitter, the lens assembly configured to couple the generated light signal to the reflective surface;
    a carrier encapsulating the emitter and the lens assembly;
    a mounting assembly configured to moveably attach the carrier to the opague element; and
    a focusing mechanism configured to vary a position of the lens assembly in relation to the reflective surface of the opague element to change a concentration of the generated light signal coupled to the reflective surface.

12. The optical transmitter of claim 11, wherein the lens assembly comprises:
    a lens configured to spread the generated light signal to irradiate substantially the entire reflective surface of the opaque element.

13. The optical transmitter of claim 12, wherein the emitter is encapsulated by the lens.

14. The optical transmitter of claim 11, wherein the focusing mechanism comprises:
    a first screw thread disposed on an external surface of a substantially cylindrical or conical portion of the carrier; and
    a second screw thread disposed on an internal surface of a corresponding and substantially cylindrical or conical portion of the mounting assembly;
    wherein the concentration of the generated light signal coupled to the reflective surface of the opaque detector can be changed by rotating the carrier in relation to the mounting assembly when the first and second screw threads are engaged to vary the position of the lens assembly in relation to the reflective surface of the opaque element.

15. The optical transmitter of claim 11, comprising:
    a receiver configured to receive the transmit signal from a transmission medium; and circuitry configured to condition the received transmit signal prior to generation of the light signal by the emitter;

wherein the receiver and circuitry are encapsulated in the carrier.

16. The optical transmitter of claim 11, wherein the reflective surface of the opaque element is aspheric.

17. The optical transmitter of claim 11, wherein the reflective surface of the opaque element is parabolic.

18. The optical transmitter of claim 11, wherein the reflective surface is configured to align portions of the redirected light signal.

19. The optical transmitter of claim 11, comprising:

a plurality of emitters arranged facing the reflective surface, the emitters configured to generate respective light signals proportional to the transmit signal, each emitter arranged to emit the corresponding light signal at a different angle of incidence to the reflective surface of the opaque element, wherein the reflective surface is configured to redirect the paths of the generated light signals in a plurality of corresponding different directions.

20. The optical transmitter of claim 19, comprising:

circuitry configured to selectively disable a portion of the plurality of emitters, wherein the directions of the redirected light signals can be tuned.

21. An optical transceiver for transmitting and receiving light signals, comprising:

an opaque element having a concave reflective surface arranged in a path of each of an outgoing and an incoming light signal, the reflective surface configured to redirect the paths of the respective light signals;

an optical detector arranged facing the reflective surface, the optical detector configured to detect a redirected incoming light signal from the reflective surface and to generate therefrom a receive signal proportional to the incoming light signal;

an emitter arranged facing the reflective surface, the emitter configured to generate the outgoing light signal proportional to a transmit signal;

a lens assembly arranged between the reflective surface of the opaque element and both the optical detector and the emitter, the lens assembly configured to couple the redirected incoming light signal to the optical detector and to couple the outgoing light signal to the reflective surface;

a carrier encapsulating the optical detector, the emitter, and the lens assembly;

a mounting assembly configured to moveably attach the carrier to the opaque element; and a focusing mechanism configured to vary a position of the lens assembly in relation to the reflective surface to change a concentration of the generated outgoing light signal coupled to the reflective surface and a concentration of the redirected incoming light signal coupled to the optical detector.

22. The optical transceiver of claim 21, wherein the lens assembly comprises:

a first lens configured to align portions of the outgoing light signal generated by the emitter;

a second lens configured to align portions of the redirected incoming light signal from the reflective surface of the opaque element; and a wavelength filter arranged between the first and second lens, the filter configured to selectively pass at least one wavelength component of the aligned portions of each of the generated outgoing light signal and the redirected incoming light signal;

wherein the first lens is configured to focus the aligned and filtered portions of the redirected incoming light signal onto a portion of the optical detector and the second lens is configured to spread the aligned and filtered portions of the generated light signal to irradiate substantially the entire reflective surface of the opaque element.

23. The optical transceiver of claim 21, wherein the focusing mechanism comprises:

a first screw thread disposed on an external surface of a substantially cylindrical or conical portion of the carrier; and a second screw thread disposed on an internal surface of a corresponding and substantially cylindrical or conical portion of the mounting assembly;

wherein the concentrations of the outgoing and incoming light signals can be changed by rotating the carrier in relation to the mounting assembly when the first and second screw threads are engaged to vary the position of the lens assembly in relation to the reflective surface of the opaque element.

24. The optical transceiver of claim 21, comprising:

a receiver configured to receive the transmit signal from a first transmission medium;

circuitry configured to condition the received transmit signal prior to generation of the outgoing light signal by the emitter;

circuitry configured to condition the receive signal generated by the optical detector for transmission over a second transmission medium; and a driver configured to transmit the conditioned receive signal over the second transmission medium;

wherein the circuitry, the receiver, and the driver are encapsulated in the carrier.

25. The optical transceiver of claim 21, wherein the reflective surface of the opaque element is aspheric.

26. The optical transceiver of claim 21, wherein the reflective surface of the opaque element is parabolic.

27. The optical transceiver of claim 21, wherein the reflective surface is configured to selectively redirect at least one wavelength component of the incoming light signal and to align portions of the outgoing light signal redirected from the reflective surface of the opaque element.

28. The optical transceiver of claim 21, comprising:

a plurality of optical detectors arranged facing the reflective surface, the optical detectors configured to detect respective portions of the redirected incoming light signal reflected at different angles from the reflective surface, each detector configured to generate a receive signal proportional to the portion of the redirected incoming light signal detected by the respective detector; and a plurality of emitters arranged facing the reflective surface, the emitters configured to generate respective outgoing light signals proportional to the transmit signal, each emitter arranged to emit the corresponding outgoing light signal at a different angle of incidence to the reflective surface of the opaque element;

wherein the reflective surface is configured to redirect the paths of the outgoing light signals in a plurality of corresponding different directions.

29. The optical transceiver of claim 28, comprising:

circuitry coupled to the plurality of optical detectors configured to determine directional information associated with the incoming light signal based on respective amplitudes of the generated receive signals; and circuitry configured to selectively disable a portion of the plurality of emitters, wherein the directions of the redirected outgoing light signals is tunable.

30. The optical transceiver of claim 28, wherein the plurality of optical detectors are arranged in an alternating grid pattern with the plurality of detectors.

31. The optical transceiver of claim 21, wherein the transceiver is configured to operate in a half-duplex mode such that only one of the outgoing and incoming light signals is redirected from the reflective surface of the opaque element at any given time.

32. The optical transceiver of claim 21, comprising:
means for isolating the paths of the outgoing and incoming light signals from one another, wherein the transceiver is configured to operate in a full-duplex mode such that the outgoing and incoming light signals can be simultaneously redirected from the reflective surface of the opaque element.

33. The optical transceiver of claim 32, wherein the means for isolating comprises at least one of:
an opaque material arranged on a portion of the reflective surface where the outgoing light signal generated by the emitter can be redirected toward the optical detector;
a first opaque object arranged between the emitter and the reflective surface to block a path of the outgoing light signal that can be redirected toward the optical detector;
a second opaque object arranged between the emitter and the optical detector; and
a wavelength of emission used by the emitter that lies outside a range of wavelengths detectable by the optical detector.

34. The optical transceiver of claim 21, wherein the emitter and the optical detector are arranged to occupy a focal point of the transceiver corresponding to a region of the reflective surface from where the outgoing and incoming light signals are substantially redirected such that the outgoing and incoming light signals can travel coaxially in a shared transmission medium.

35. The optical transceiver of claim 21, wherein the opaque element having the reflective surface is configured to be collapsed into a smaller form factor when the transceiver is not in use relative to a form factor of the opaque element when the transceiver is in use.

36. The optical transceiver of claim 21, comprising:
an acoustical signal generator arranged near a focal point of the reflective surface of the opaque element, the acoustical signal generator configured to launch an acoustical signal in a direction of a distant receiver; and
an acoustical signal detector arranged near the focal point of the reflective surface of the opaque element, the acoustical signal detector configured to detect an acoustical signal launched from a distant transmitter.

37. An optical transceiver for transmitting and receiving light signals, comprising:
an emitter configured to generate an outgoing light signal proportional to a transmit signal;
an opaque element having a concave reflective surface arranged facing the emitter in a path of the outgoing light signal, the reflective surface configured to redirect the path of the generated outgoing light signal;
a first lens assembly arranged between the reflective surface and the emitter, the first lens assembly configured to couple the generated outgoing light signal to the reflective surface;
an optical detector arranged facing away from the reflective surface in a path of an incoming light signal, the optical detector configured to detect the incoming light signal and to generate a receive signal proportional thereto;
a second lens assembly arranged between the optical detector and a distant transmitter of the incoming light signal, the second lens assembly configured to couple the incoming light signal to the optical detector;
a carrier encapsulating the optical detector, the emitter, and the first and second lens assemblies;
a mounting assembly configured to moveably attach the carrier to the opaque element; and
a focusing mechanism configured to vary a position of the first lens assembly in relation to the reflective surface to change a concentration of the generated outgoing light signal coupled to the reflective surface.

38. The optical transceiver of claim 37, wherein
the first lens assembly comprises:
a first lens configured to spread the generated outgoing light signal to irradiate substantially the entire reflective surface of the opaque element; and
the second lens assembly comprises:
a second lens configured to align portions of the incoming light signal;
a wavelength filter configured to selectively pass at least one wavelength component of the aligned portions of the incoming light signal; and
a third lens configured to focus the aligned and filtered portions of the incoming light signal onto a portion of the optical detector.

39. The optical transceiver of claim 37, wherein the focusing mechanism comprises:
a first screw thread disposed on an external surface of a substantially cylindrical or conical portion of the carrier; and
a second screw thread disposed on an internal surface of a corresponding and substantially cylindrical or conical portion of the mounting assembly;
wherein the concentration of the outgoing light signal can be changed by rotating the carrier in relation to the mounting assembly when the first and second screw threads are engaged to vary the position of the first lens assembly in relation to the reflective surface of the opaque element.

40. The optical transceiver of claim 37, comprising:
a receiver configured to receive the transmit signal from a first transmission medium;
circuitry configured to condition the received transmit signal prior to generation of the outgoing light signal by the emitter;
circuitry configured to condition the receive signal generated by the optical detector for transmission over a second transmission medium; and
a driver configured to transmit the conditioned receive signal over the second transmission medium;
wherein the circuitry, the receiver, and the driver are encapsulated in the carrier.

41. The optical transceiver of claim 37, wherein the optical detector and the emitter are arranged in the carrier such that the incoming light signal and the redirected outgoing light signal can travel in opposing directions and substantially coaxially in a shared transmission medium between the distant transmitter and the transceiver.

42. The optical transceiver of claim 37, wherein the reflective surface of the opaque element is aspheric.

43. The optical transceiver of claim 37, wherein the reflective surface of the opaque element is parabolic.

44. The optical transceiver of claim 37, wherein the reflective surface is configured to align portions of the redirected outgoing light signal.

45. The optical transceiver of claim 37, wherein the opaque element having the reflective surface is configured to be collapsed into a smaller form factor when the transceiver is not in use relative to a form factor of the opaque element when the transceiver is in use.

46. The optical transceiver of claim 37, comprising:
an acoustical signal generator arranged near a focal point of the reflective surface of the opaque element, the acoustical signal generator configured to launch an acoustical signal in a direction of a distant receiver; and
an acoustical signal detector arranged near the focal point of the reflective surface of the opaque element, the acoustical signal detector configured to detect an acoustical signal launched from a distant transmitter.

47. An optical transceiver for transmitting and receiving light signals, comprising:
an opaque objective element having a concave reflective surface arranged in a path of an incoming light signal, the reflective surface configured to redirect the path of the incoming light signal;
an optical detector arranged facing the reflective surface, the optical detector configured to detect a redirected incoming light signal from the reflective surface and to generate therefrom a receive signal proportional to the incoming light signal;
a first lens assembly arranged between the reflective surface and the optical detector, the first lens assembly configured to couple the redirected incoming light signal to the optical detector;
an emitter arranged facing away from the reflective surface, the emitter configured to generate an outgoing light signal proportional to a transmit signal;
a second lens assembly configured to couple the outgoing light signal to a transmission medium between the emitter and a distant receiver of the outgoing light signal;
a carrier encapsulating the optical detector, the emitter, and the first and second lens assemblies;
a mounting assembly configured to moveably attach the carrier to the objective element; and
a focusing mechanism configured to vary a position of the first lens assembly in relation to the reflective surface to change a concentration of the redirected incoming light signal coupled to the optical detector.

48. The optical transceiver of claim 47, wherein
the first lens assembly comprises:
a first lens configured to align portions of the redirected incoming light signal;
a wavelength filter configured to selectively pass at least one wavelength component of the aligned portions of the redirected incoming light signal; and
a second lens configured to focus the aligned and filtered portions of the redirected incoming light signal onto a portion of the optical detector; and
the second lens assembly comprises:
a third lens configured to align portions of the generated outgoing light signal and to project the aligned portions in a direction of the distant receiver.

49. The optical transceiver of claim 47, wherein the focusing mechanism comprises:
a first screw thread disposed on an external surface of a substantially cylindrical or conical portion of the carrier; and
a second screw thread disposed on an internal surface of a corresponding and substantially cylindrical or conical portion of the mounting assembly;
wherein the concentration of the incoming light signal can be changed by rotating the carrier in relation to the mounting assembly when the first and second screw threads are engaged to vary the position of the first lens assembly in relation to the reflective surface of the objective element.

50. The optical transceiver of claim 47, comprising:
a receiver configured to receive the transmit signal from a first transmission medium;
circuitry configured to condition the received transmit signal prior to generation of the outgoing light signal by the emitter;
circuitry configured to condition the receive signal generated by the optical detector for transmission over a second transmission medium; and
a driver configured to transmit the conditioned receive signal over the second transmission medium;
wherein the circuitry, the receiver, and the driver are encapsulated in the carrier.

51. The optical transceiver of claim 47, wherein the optical detector and the emitter are arranged in the carrier such that the incoming light signal and the outgoing light signal can travel in opposing directions and substantially coaxially in a shared transmission medium between the distant receiver and the transceiver.

52. The optical transceiver of claim 47, wherein the reflective surface of the objective element is aspheric.

53. The optical transceiver of claim 47, wherein the reflective surface of the objective element is parabolic.

54. The optical transceiver of claim 47, wherein the reflective surface is configured to selectively redirect at least one wavelength component of the incoming light signal.

55. The optical transceiver of claim 47, wherein the objective element having the reflective surface is configured to be collapsed into a smaller form factor when the transceiver is not in use relative to a form factor of the objective element when the transceiver is in use.

56. The optical transceiver of claim 47, comprising:
an acoustical signal generator arranged near a focal point of the reflective surface of the opaque element, the acoustical signal generator configured to launch an acoustical signal in a direction of a distant receiver; and
an acoustical signal detector arranged near the focal point of the reflective surface of the opaque element, the acoustical signal detector configured to detect an acoustical signal launched from a distant transmitter.

57. An optical coupler for coupling light signals between different transmission media, comprising:
an opaque element having a concave reflective surface arranged in a path of each of an outgoing light signal carried over a fiber optic cable and an incoming light signal carried over free space, the reflective surface configured to redirect the paths of the respective light signals;
a lens assembly arranged between the reflective surface of the opaque element and the fiber optic cable, the lens assembly configured to couple the outgoing light signal from the fiber optic cable to the reflective surface and to couple a redirected incoming light signal from the reflective surface to the fiber optic cable, wherein a redirected outgoing light signal from the reflective surface of the opaque element can be carried over free space;

a carrier encapsulating the lens assembly and having a connector configured to secure the fiber optic cable;

a mounting assembly configured to moveably attach the carrier to the opaque element; and a focusing mechanism configured to vary a position of the lens assembly in relation to the reflective surface to change a concentration of the outgoing light signal coupled to the reflective surface and a concentration of the redirected incoming light signal coupled to the fiber optic cable.

58. The optical coupler of claim 57, wherein the lens assembly comprises:

a first lens configured to align portions of the outgoing light signal from the fiber optic cable;

a second lens configured to align portions of the redirected incoming light signal from the reflective surface of the opaque element; and a wavelength filter arranged between the first and second lens, the filter configured to selectively pass at least one wavelength component of the aligned portions of each of the outgoing light signal and the redirected incoming light signal;

wherein the first lens is configured to focus the aligned and filtered portions of the redirected incoming light signal onto a portion of the fiber optic cable and the second lens is configured to spread the aligned and filtered portions of the generated light signal to irradiate substantially the entire reflective surface of the opaque element.

59. The optical coupler of claim 57, wherein the focusing mechanism comprises:

a first screw thread disposed on an external surface of a substantially cylindrical or conical portion of the carrier; and a second screw thread disposed on an internal surface of a corresponding and substantially cylindrical or conical portion of the mounting assembly;

wherein the concentrations of the outgoing and incoming light signals can be changed by rotating the carrier in relation to the mounting assembly when the first and second screw threads are engaged to vary the position of the lens assembly in relation to the reflective surface of the opaque element.

60. The optical coupler of claim 57, wherein the reflective surface of the opaque element is aspheric.

61. The optical coupler of claim 57, wherein the reflective surface of the opaque element is parabolic.

62. The optical coupler of claim 57, wherein the reflective surface is configured to selectively redirect at least one wavelength component of the incoming light signal and is configured to align portions of the outgoing light signal redirected from the reflective surface of the opaque element.

63. The optical coupler of claim 57, comprising:

means for isolating the paths of the outgoing and incoming light signals from one another, wherein the outgoing and incoming light signals can be simultaneously redirected from the reflective surface of the opaque element.

64. The optical coupler of claim 63, including optical shielding comprising at least one of:

an opaque material arranged on a portion of the reflective surface where the outgoing light signal can be redirected back toward the fiber optic cable; and an opaque object arranged between the fiber optic cable and the reflective surface to block a path of the outgoing light signal that can be redirected back toward the fiber optic cable.

65. An optical transceiver for transmitting and receiving light signals, comprising:

an opaque element having a concave reflective surface arranged in a path of each of an outgoing and an incoming light signal, the reflective surface configured to redirect the paths of the respective light signals;

an optical detector arranged facing the reflective surface, the optical detector configured to detect a redirected incoming light signal from the reflective surface and to generate therefrom a receive signal proportional to the incoming light signal;

an emitter arranged facing the reflective surface, the emitter configured to generate the outgoing light signal proportional to a transmit signal; and a lens assembly arranged between the reflective surface of the opaque element and both the optical detector and the emitter, the lens assembly configured to couple the redirected incoming light signal to the optical detector and to couple the outgoing light signal to the reflective surface, wherein the lens assembly comprises a first lens configured to align portions of the outgoing light signal generated by the emitter, a second lens configured to align portions of the redirected incoming light signal from the reflective surface of the opaque element, and a wavelength filter arranged between the first and second lens, the filter configured to selectively pass at least one wavelength component of the aligned portions of each of the generated outgoing light signal and the redirected incoming light signal, and wherein the first lens is configured to focus the aligned and filtered portions of the redirected incoming light signal onto a portion of the optical detector and the second lens is configured to spread the aligned and filtered portions of the generated light signal to irradiate substantially the entire reflective surface of the opaque element.

66. An optical transceiver for transmitting and receiving light signals, comprising:

an opaque element having a concave reflective surface arranged in a path of each of an outgoing and an incoming light signal, the reflective surface configured to redirect the paths of the respective light signals;

an optical detector arranged facing the reflective surface, the optical detector configured to detect a redirected incoming light signal from the reflective surface and to generate therefrom a receive signal proportional to the incoming light signal;

an emitter arranged facing the reflective surface, the emitter configured to generate the outgoing light signal proportional to a transmit signal;

a lens assembly arranged between the reflective surface of the opaque element and both the optical detector and the emitter, the lens assembly configured to couple the redirected incoming light signal to the optical detector and to couple the outgoing light signal to the reflective surface; and means for isolating the paths of the outgoing and incoming light signals from one another, wherein the transceiver is configured to operate in a full-duplex mode such that the outgoing and incoming light signals can be simultaneously redirected from the reflective surface of the opaque element, wherein the means for isolating comprises at least one of:

an opaque material arranged on a portion of the reflective surface where the outgoing light signal generated by the emitter can be redirected toward the optical detector, a first opaque object arranged between the emitter and the reflective surface to block a path of the outgoing light signal that can be redirected toward the optical detector, a second opaque object arranged between the emitter and the optical detector, and a wavelength of emission used by the emitter that lies outside a range of wavelengths detectable by the optical detector.

* * * * *